US012537742B2

(12) United States Patent
Tonesi et al.

(10) Patent No.: US 12,537,742 B2
(45) Date of Patent: Jan. 27, 2026

(54) NEGOTIATION AND NOTIFICATION OF PROTOCOL DATA UNIT (PDU) SET OR DATA BURST MARKING MECHANISMS

(71) Applicant: QUALCOMM Incorporated, San Diego, CA (US)

(72) Inventors: Dario Serafino Tonesi, San Diego, CA (US); Miguel Griot, La Jolla, CA (US); Sunghoon Kim, San Diego, CA (US); Prashanth Haridas Hande, San Diego, CA (US); Thomas Stockhammer, Bergen (DE); Yih-Hao Lin, San Diego, CA (US); Mickael Mondet, Louannec (FR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/312,551

(22) Filed: May 4, 2023

(65) Prior Publication Data

US 2023/0362058 A1  Nov. 9, 2023

Related U.S. Application Data

(60) Provisional application No. 63/339,171, filed on May 6, 2022.

(51) Int. Cl.
*H04L 41/0894* (2022.01)
*H04L 9/40* (2022.01)
(Continued)

(52) U.S. Cl.
CPC .......... *H04L 41/0894* (2022.05); *H04L 41/04* (2013.01); *H04L 47/31* (2013.01);
(Continued)

(58) Field of Classification Search
CPC ..... H04L 41/0894; H04L 41/04; H04L 47/31; H04L 63/02; H04L 63/0263; H04L 67/34; H04W 28/0268; H04W 28/02
See application file for complete search history.

(56) References Cited

U.S. PATENT DOCUMENTS

| 2003/0115313 A1* | 6/2003 | Kanada | H04L 41/0213 709/223 |
| 2003/0214954 A1* | 11/2003 | Oldak | H04L 47/32 370/395.52 |

(Continued)

OTHER PUBLICATIONS

CATT: "New Solution for KI#415: PDU Set Identification and Marking", 3GPP TSG-WG SA2 Meeting #150E e-meeting, S2-2202716, 3rd Generation Partnership Project, Mobile Competence Centre, 650, Route Des Lucioles, F-06921 Sophia-Antipolis Cedex, France, vol. SA WG2, No. e-meeting, Apr. 6, 2022-Apr. 14, 2022, Mar. 29, 2022, XP052133550, 9 pages, paragraph [6.x.2.3.1].

(Continued)

*Primary Examiner* — Ramy M Osman
(74) *Attorney, Agent, or Firm* — Paul M. McAdams; Holland & Hart LLP

(57) ABSTRACT

Methods, systems, and devices for wireless communications are described. In some systems, one or more network entities or functionalities may participate in a two-step procedure according to which the one or more network entities or functionalities negotiate a set of available marking mechanisms for identification of packets as belonging to a same protocol data unit (PDU) set or data burst and according to which an application function (AF) may receive a notification of one or more selected marking mechanisms that are to be used for a traffic flow. The AF may negotiate the set of available marking mechanisms with a network exposure
(Continued)

function (NEF) and may receive an indication of the one or more selected marking mechanisms from a session management function (SMF).

26 Claims, 16 Drawing Sheets

(51) Int. Cl.
  *H04L 41/04* (2022.01)
  *H04L 47/31* (2022.01)
  *H04L 67/00* (2022.01)
  *H04W 28/02* (2009.01)

(52) U.S. Cl.
  CPC .......... *H04L 63/02* (2013.01); *H04L 63/0263* (2013.01); *H04L 67/34* (2013.01); *H04W 28/0268* (2013.01)

(56) References Cited

U.S. PATENT DOCUMENTS

| | | | | |
|---|---|---|---|---|
| 2018/0192471 | A1* | 7/2018 | Li | H04W 72/53 |
| 2020/0296221 | A1* | 9/2020 | Zhou | H04M 15/8016 |
| 2020/0351391 | A1* | 11/2020 | Son | H04W 80/10 |
| 2020/0404106 | A1* | 12/2020 | Belling | H04W 8/10 |
| 2021/0288886 | A1* | 9/2021 | Örtenblad | H04L 41/145 |
| 2021/0314266 | A1* | 10/2021 | Li | H04L 47/2441 |
| 2021/0352521 | A1* | 11/2021 | Pan | H04L 47/805 |
| 2022/0053364 | A1* | 2/2022 | Kim | H04W 28/0268 |
| 2022/0279431 | A1* | 9/2022 | Azorero | H04L 67/06 |
| 2022/0312158 | A1* | 9/2022 | Gonzalez | H04L 41/0897 |
| 2023/0100148 | A1* | 3/2023 | Lee | H04W 12/106 726/26 |
| 2023/0127601 | A1* | 4/2023 | Kousaridas | H04W 40/12 455/432.1 |
| 2023/0269574 | A1* | 8/2023 | Ha | H04W 8/20 455/422.1 |
| 2023/0319638 | A1* | 10/2023 | Kahn | H04W 28/0268 370/252 |
| 2023/0337267 | A1* | 10/2023 | Liu | H04W 24/02 |
| 2023/0362058 | A1* | 11/2023 | Tonesi | H04L 41/0894 |
| 2024/0015567 | A1 | 1/2024 | Mladin et al. | |
| 2024/0064190 | A1* | 2/2024 | Yang | H04L 65/1069 |
| 2024/0340322 | A1* | 10/2024 | Bouazizi | H04L 65/65 |

OTHER PUBLICATIONS

Huawei, et al., "KI#4: Solution for PDU Set integrated QoS Handling", 3GPP TSG-WG SA2 Meeting #150E e-meeting, S2-2202408, 3rd Generation Partnership Project, Mobile Competence Centre, 650, Route Des Lucioles, F-06921 Sophia-Antipolis Cedex, France, vol. Sa WG2, No. e-meeting, Apr. 6, 2022-Apr. 12, 2022, Mar. 29, 2022, XP052133250, 6 pages, figures 6.x.3.1-1, p. 4, line 5-line 7, p. 4, line 12-line 16, p. 3, line 2-line 19.

International Search Report and Written Opinion—PCT/US2023/066641—ISA/EPO—Aug. 10, 2023.

OPPO: "New Solution: Leverage RTP Layer Info for PDU Set Handling", 3GPP SA WG2 Meeting #150E, S2-2203543, 3rd Generation Partnership Project, Mobile Competence Centre, 650, Route Des Lucioles, F-06921 Sophia-Antipolis Cedex, France, vol. SA WG2, No. Elbonia, Apr. 6, 2022-Apr. 12, 2022, Apr. 13, 2022, 3 pages, XP052136314, paragraph [6.x.3], figures 6.x.3-1.

VIVO: "Solution for KI#4&5 Handling PDU Set within QoS Flow", SA WG2 Meeting #150E (e-meeting), S2-2202111, 3rd Generation Partnership Project, Mobile Competence Centre, 650, Route Des Lucioles, F-06921 Sophia-Antipolis Cedex, France, vol. Sa WG2, No. e-meeting, Apr. 6, 2022-Apr. 16, 2022, Mar. 29, 2022, XP052132957, 5 pages, paragraph [6.x.3], figures 6.x.3-1, paragraph [6.x.2].

* cited by examiner

NEGOTIATION AND NOTIFICATION OF PROTOCOL DATA UNIT (PDU) SET OR DATA BURST MARKING MECHANISMS

CROSS REFERENCE

The present Application for Patent claims the benefit of U.S. Provisional Patent Application No. 63/339,171 by TONESI et al., entitled "NEGOTIATION AND NOTIFICATION OF PROTOCOL DATA UNIT (PDU) SET OR DATA BURST MARKING MECHANISMS," filed May 6, 2022, and assigned to the assignee hereof. U.S. Provisional Patent Application No. 63/339,171 is expressly incorporated by reference herein in its entirety.

INTRODUCTION

The following relates to wireless communications, including negotiation and notification of protocol data unit (PDU) set or data burst marking mechanisms.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support negotiation and notification of protocol data unit (PDU) set or data burst marking mechanisms. For example, the described techniques provide for a mutually understood procedure to support synchronization between one or more network entities or functionalities as to which specific marking mechanism is to be used for a traffic flow that involves one or both of PDU sets or data bursts. In some implementations, for example, the one or more network entities or functionalities may select, identify, or otherwise determine which specific marking mechanism is to be used for a traffic flow in accordance with a two-step procedure, which may involve a first step associated with a network negotiation between an application function (AF) and a network exposure function (NEF) and a second step associated with a notification between a session management function (SMF) and the AF.

A method of wireless communication performed by a network entity is described. The method may include outputting, to a core network entity, a request for transmission of information indicative of a set of available marking mechanisms for identification of packets that belong to a PDU set or a same data burst, obtaining, from the core network entity and responsive to the request, the information indicative of the set of available marking mechanisms, and outputting, to the core network entity, an indication of a subset of one or more marking mechanisms from the set of available marking mechanisms, where at least one marking mechanism of the subset of one or more marking mechanisms corresponds to a policy control rule update for the core network entity.

A first network node for wireless communication is described. The first network node may include a memory, and at least one processor coupled to the memory, the at least one processor configured to output, to a core network entity, a request for transmission of information indicative of a set of available marking mechanisms for identification of packets that belong to a same PDU set or a same data burst, obtain, from the core network entity and responsive to the request, the information indicative of the set of available marking mechanisms, and output, to the core network entity, an indication of a subset of one or more marking mechanisms from the set of available marking mechanisms, where at least one marking mechanism of the subset of one or more marking mechanisms corresponds to a policy control rule update for the core network entity.

An apparatus for wireless communication at a network entity is described. The apparatus may include a processor, memory coupled with the processor, and instructions stored in the memory. The instructions may be executable by the processor to cause the apparatus to output, to a core network entity, a request for transmission of information indicative of a set of available marking mechanisms for identification of packets that belong to a same PDU set or a same data burst, obtain, from the core network entity and responsive to the request, the information indicative of the set of available marking mechanisms, and output, to the core network entity, an indication of a subset of one or more marking mechanisms from the set of available marking mechanisms, where at least one marking mechanism of the subset of one or more marking mechanisms corresponds to a policy control rule update for the core network entity.

Another apparatus for wireless communication at a network entity is described. The apparatus may include means for outputting, to a core network entity, a request for transmission of information indicative of a set of available marking mechanisms for identification of packets that belong to a same PDU set or a same data burst, means for obtaining, from the core network entity and responsive to the request, the information indicative of the set of available marking mechanisms, and means for outputting, to the core network entity, an indication of a subset of one or more marking mechanisms from the set of available marking mechanisms, where at least one marking mechanism of the subset of one or more marking mechanisms corresponds to a policy control rule update for the core network entity.

A non-transitory computer-readable medium having code for wireless communication stored thereon is described. The code, when executed by a network entity, may cause the network entity to output, to a core network entity, a request for transmission of information indicative of a set of available marking mechanisms for identification of packets that belong to a same PDU set or a same data burst, obtain, from the core network entity and responsive to the request, the information indicative of the set of available marking mechanisms, and output, to the core network entity, an indication of a subset of one or more marking mechanisms from the set of available marking mechanisms, where at least one marking mechanism of the subset of one or more marking mechanisms corresponds to a policy control rule update for the core network entity.

In some examples of the method, apparatuses, and non-transitory computer-readable medium described herein, outputting the request may include operations, features, means, or instructions for outputting the request to an NEF via a subscription request message, where the core network entity includes the NEF.

In some examples of the method, apparatuses, and non-transitory computer-readable medium described herein, the subscription request message includes an event that indicates that the request corresponds to one or both of PDU set marking or data burst marking.

In some examples of the method, apparatuses, and non-transitory computer-readable medium described herein, the subscription request message may be an event exposure subscription request message.

In some examples of the method, apparatuses, and non-transitory computer-readable medium described herein, obtaining the information may include operations, features, means, or instructions for obtaining the information from an NEF via an event exposure notification message, where the core network entity includes the NEF.

In some examples of the method, apparatuses, and non-transitory computer-readable medium described herein, the core network entity may include an NEF, and the information indicative of the set of available marking mechanisms may be associated with the NEF.

In some examples of the method, apparatuses, and non-transitory computer-readable medium described herein, obtaining the information may include operations, features, means, or instructions for obtaining capability information associated with the core network entity, where the capability information is indicative of the set of available marking mechanisms, and where an obtainment of the information is associated with an exposure of the set of available marking mechanisms to the network entity.

In some examples of the method, apparatuses, and non-transitory computer-readable medium described herein, outputting the indication may include operations, features, means, or instructions for outputting the indication to a policy control function (PCF), where the core network entity includes the PCF.

In some examples of the method, apparatuses, and non-transitory computer-readable medium described herein, the core network entity may include a PCF, and the policy control rule update for the core network entity may be associated with the PCF.

In some examples of the method, apparatuses, and non-transitory computer-readable medium described herein, each respective marking mechanism of the subset of one or more marking mechanisms may be compatible with the network entity.

In some examples of the method, apparatuses, and non-transitory computer-readable medium described herein, outputting the indication may include operations, features, means, or instructions for outputting the indication to the PCF via an NEF.

In some examples of the method, apparatuses, and non-transitory computer-readable medium described herein, the set of available marking mechanisms may be associated with a network configuration.

In some examples of the method, apparatuses, and non-transitory computer-readable medium described herein, the set of available marking mechanisms may be stored in one or more of a memory accessible by an NEF; a unified data repository; or an operations, administration, and maintenance entity in accordance with the network configuration.

In some examples of the method, apparatuses, and non-transitory computer-readable medium described herein, obtaining the information may include operations, features, means, or instructions for obtaining the information from one or more of a memory accessible by an NEF; a unified data repository; or an operations, administration, and maintenance entity in accordance with the network configuration.

In some examples of the method, apparatuses, and non-transitory computer-readable medium described herein, the network entity may be an AF and the core network entity includes one or both of an NEF or a PCF.

A method of wireless communication performed by a first network entity is described. The method may include obtaining, from a second network entity, a request for transmission of information indicative of a set of available marking mechanisms for identification of packets that belong to a same PDU set or a same data burst, obtaining, in accordance with a network configuration, the information indicative of the set of available marking mechanisms, and outputting, to the second network entity and responsive to the request, the information indicative of the set of available marking mechanisms.

A first network node for wireless communication is described. The first network node may include a memory, and at least one processor coupled to the memory, the at least one processor configured to obtain, from a second network entity, a request for transmission of information indicative of a set of available marking mechanisms for identification of packets that belong to a same PDU set or a same data burst, obtain, in accordance with a network configuration, the information indicative of the set of available marking mechanisms, and output, to the second network entity and responsive to the request, the information indicative of the set of available marking mechanisms.

An apparatus for wireless communication at a first network entity is described. The apparatus may include a processor, memory coupled with the processor, and instructions stored in the memory. The instructions may be executable by the processor to cause the apparatus to obtain, from a second network entity, a request for transmission of information indicative of a set of available marking mechanisms for identification of packets that belong to a same PDU set or a same data burst, obtain, in accordance with a network configuration, the information indicative of the set of available marking mechanisms, and output, to the second network entity and responsive to the request, the information indicative of the set of available marking mechanisms.

Another apparatus for wireless communication at a first network entity is described. The apparatus may include means for obtaining, from a second network entity, a request for transmission of information indicative of a set of available marking mechanisms for identification of packets that belong to a same PDU set or a same data burst, means for obtaining, in accordance with a network configuration, the information indicative of the set of available marking mechanisms, and means for outputting, to the second network entity and responsive to the request, the information indicative of the set of available marking mechanisms.

A non-transitory computer-readable medium having code for wireless communication stored thereon is described. The code, when executed by a first network entity, may cause the first network entity to obtain, from a second network entity, a request for transmission of information indicative of a set of available marking mechanisms for identification of packets that belong to a same PDU set or a same data burst, obtain, in accordance with a network configuration, the information indicative of the set of available marking mechanisms, and output, to the second network entity and responsive to the request, the information indicative of the set of available marking mechanisms.

In some examples of the method, apparatuses, and non-transitory computer-readable medium described herein, obtaining the request may include operations, features, means, or instructions for obtaining the request from an AF via a subscription request message, where the second network entity may be the AF.

In some examples of the method, apparatuses, and non-transitory computer-readable medium described herein, the subscription request message includes an event that indicates that the request corresponds to one or both of PDU set marking or data burst marking.

In some examples of the method, apparatuses, and non-transitory computer-readable medium described herein, the subscription request message may be an event exposure subscription request message.

In some examples of the method, apparatuses, and non-transitory computer-readable medium described herein, outputting the information may include operations, features, means, or instructions for outputting the information to an AF via an event exposure notification message, where the second network entity may be the AF.

Some examples of the method, apparatuses, and non-transitory computer-readable medium described herein may further include operations, features, means, or instructions for obtaining, from the second network entity, information indicative of a subset of one or more marking mechanisms from the set of available marking mechanisms and outputting, to a PCF, an indication of the subset of one or more marking mechanisms, where at least one marking mechanism of the subset of one or more marking mechanisms corresponds to a policy control rule update for the PCF.

In some examples of the method, apparatuses, and non-transitory computer-readable medium described herein, each respective marking mechanism of the subset of one or more marking mechanisms may be compatible with the second network entity.

In some examples of the method, apparatuses, and non-transitory computer-readable medium described herein, the set of available marking mechanisms may be stored in one or more of a memory accessible by an NEF; a unified data repository; or an operations, administration, and maintenance entity in accordance with the network configuration.

In some examples of the method, apparatuses, and non-transitory computer-readable medium described herein, obtaining the information may include operations, features, means, or instructions for obtaining the information from one or more of a memory accessible by an NEF; a unified data repository; or an operations, administration, and maintenance entity in accordance with the network configuration.

In some examples of the method, apparatuses, and non-transitory computer-readable medium described herein, the first network entity may be an NEF and the second network entity may be an AF.

A method of wireless communication performed by a first network entity is described. The method may include obtaining, from second network entity, information indicative of at least one marking mechanism from a set of available marking mechanisms, where the set of available marking mechanisms enables identification of packets that belong to a same PDU set or a same data burst and updating a policy control rule associated with one or both of PDU set marking or data burst marking in accordance with the at least one marking mechanism.

A first network node for wireless communication is described. The first network node may include a memory, and at least one processor coupled to the memory, the at least one processor configured to obtain, from second network entity, information indicative of at least one marking mechanism from a set of available marking mechanisms, where the set of available marking mechanisms enables identification of packets that belong to a same PDU set or a same data burst and update a policy control rule associated with one or both of PDU set marking or data burst marking in accordance with the at least one marking mechanism.

An apparatus for wireless communication at a first network entity is described. The apparatus may include a processor, memory coupled with the processor, and instructions stored in the memory. The instructions may be executable by the processor to cause the apparatus to obtain, from second network entity, information indicative of at least one marking mechanism from a set of available marking mechanisms, where the set of available marking mechanisms enables identification of packets that belong to a same PDU set or a same data burst and update a policy control rule associated with one or both of PDU set marking or data burst marking in accordance with the at least one marking mechanism.

Another apparatus for wireless communication at a first network entity is described. The apparatus may include means for obtaining, from second network entity, information indicative of at least one marking mechanism from a set of available marking mechanisms, where the set of available marking mechanisms enables identification of packets that belong to a same PDU set or a same data burst and means for updating a policy control rule associated with one or both of PDU set marking or data burst marking in accordance with the at least one marking mechanism.

A non-transitory computer-readable medium having code for wireless communication stored thereon is described. The code, when executed by a first network entity, may cause the first network entity to obtain, from second network entity, information indicative of at least one marking mechanism from a set of available marking mechanisms, where the set of available marking mechanisms enables identification of packets that belong to a same PDU set or a same data burst and update a policy control rule associated with one or both of PDU set marking or data burst marking in accordance with the at least one marking mechanism.

In some examples of the method, apparatuses, and non-transitory computer-readable medium described herein, updating the policy control rule may include operations, features, means, or instructions for permitting the first network entity to modify marking options for one or both of the PDU set marking or the data burst marking for a dynamic policy control rule used by an SMF.

In some examples of the method, apparatuses, and non-transitory computer-readable medium described herein, obtaining the information may include operations, features, means, or instructions for obtaining the information from an AF via an NEF, where the second network entity may be the AF.

In some examples of the method, apparatuses, and non-transitory computer-readable medium described herein, each respective marking mechanism of the at least one marking mechanism may be compatible with the AF.

In some examples of the method, apparatuses, and non-transitory computer-readable medium described herein, the set of available marking mechanisms may be associated with a network configuration.

In some examples of the method, apparatuses, and non-transitory computer-readable medium described herein, the set of available marking mechanisms may be stored in one or more of a memory accessible by an NEF; a unified data repository; or an operations, administration, and maintenance entity in accordance with the network configuration.

Some examples of the method, apparatuses, and non-transitory computer-readable medium described herein may further include operations, features, means, or instructions for obtaining the information from one or more of a memory accessible by an NEF; a unified data repository; or an operations, administration, and maintenance entity in accordance with the network configuration.

In some examples of the method, apparatuses, and non-transitory computer-readable medium described herein, the first network entity may be a PCF and the second network entity may be an AF.

A method of wireless communication performed by a first network entity is described. The method may include outputting, to a core network entity, a request for transmission of information indicative of a marking mechanism, where the marking mechanism enables identification of packets that belong to a same PDU set or a same data burst, obtaining, from the core network entity and in accordance with the request, the information indicative of the marking mechanism, and outputting, to a second network entity, an indication of the marking mechanism, where the indication of the marking mechanism to the second network entity is associated with an establishment of a traffic flow in accordance with the marking mechanism.

A first network node for wireless communication is described. The first network node may include a memory, and at least one processor coupled to the memory, the at least one processor configured to output, to a core network entity, a request for transmission of information indicative of a marking mechanism, where the marking mechanism enables identification of packets that belong to a same PDU set or a same data burst, obtain, from the core network entity and in accordance with the request, the information indicative of the marking mechanism, and output, to a second network entity, an indication of the marking mechanism, where the indication of the marking mechanism to the second network entity is associated with an establishment of a traffic flow in accordance with the marking mechanism.

An apparatus for wireless communication at a first network entity is described. The apparatus may include a processor, memory coupled with the processor, and instructions stored in the memory. The instructions may be executable by the processor to cause the apparatus to output, to a core network entity, a request for transmission of information indicative of a marking mechanism, where the marking mechanism enables identification of packets that belong to a same PDU set or a same data burst, obtain, from the core network entity and in accordance with the request, the information indicative of the marking mechanism, and output, to a second network entity, an indication of the marking mechanism, where the indication of the marking mechanism to the second network entity is associated with an establishment of a traffic flow in accordance with the marking mechanism.

Another apparatus for wireless communication at a first network entity is described. The apparatus may include means for outputting, to a core network entity, a request for transmission of information indicative of a marking mechanism, where the marking mechanism enables identification of packets that belong to a same PDU set or a same data burst, means for obtaining, from the core network entity and in accordance with the request, the information indicative of the marking mechanism, and means for outputting, to a second network entity, an indication of the marking mechanism, where the indication of the marking mechanism to the second network entity is associated with an establishment of a traffic flow in accordance with the marking mechanism.

A non-transitory computer-readable medium having code for wireless communication stored thereon is described. The code, when executed by a first network entity, may cause the first network entity to output, to a core network entity, a request for transmission of information indicative of a marking mechanism, where the marking mechanism enables identification of packets that belong to a same PDU set or a same data burst, obtain, from the core network entity and in accordance with the request, the information indicative of the marking mechanism, and output, to a second network entity, an indication of the marking mechanism, where the indication of the marking mechanism to the second network entity is associated with an establishment of a traffic flow in accordance with the marking mechanism.

In some examples of the method, apparatuses, and non-transitory computer-readable medium described herein, outputting the request may include operations, features, means, or instructions for outputting the request to an SMF via a subscription request message, where the core network entity includes the SMF.

In some examples of the method, apparatuses, and non-transitory computer-readable medium described herein, the subscription request message includes an event that indicates that the request corresponds to one or both of PDU set marking or data burst marking.

In some examples of the method, apparatuses, and non-transitory computer-readable medium described herein, outputting the request may include operations, features, means, or instructions for outputting the request to the SMF via an NEF and a unified data management function, where the core network entity further includes the NEF and the unified data management function.

In some examples of the method, apparatuses, and non-transitory computer-readable medium described herein, the subscription request message may be an event exposure subscription request message.

In some examples of the method, apparatuses, and non-transitory computer-readable medium described herein, the marking mechanism may be associated with a dynamic retrieval of one or more policy control rules from a PCF during a PDU session establishment or modification and the one or more policy control rules may be based on one or more marking mechanisms that may be compatible with the first network entity.

In some examples of the method, apparatuses, and non-transitory computer-readable medium described herein, the marking mechanism may be associated with one or more policy control rules that may be predefined for the core network entity and the one or more policy control rules may be based on of one or more marking mechanisms that may be compatible with the first network entity.

In some examples of the method, apparatuses, and non-transitory computer-readable medium described herein, obtaining the information may include operations, features, means, or instructions for obtaining the information from an SMF via an event exposure notification message, where the core network entity includes the SMF.

In some examples of the method, apparatuses, and non-transitory computer-readable medium described herein, the marking mechanism enables identification of PDU sets or data bursts sent by an application server to a user plane function.

In some examples of the method, apparatuses, and non-transitory computer-readable medium described herein, the first network entity may be an AF, the core network entity may be an SMF and the second network entity may be an application server.

A method of wireless communication performed by a first network entity is described. The method may include obtaining, from a second network entity, a request for transmission of information indicative of a marking mechanism, where the marking mechanism enables identification of packets that belong to a same PDU set or a same data burst, obtaining, in accordance with one or more policy control rules, the information indicative of the marking mechanism, and outputting, to the second network entity and in accordance with the request, the information indicative of the marking mechanism, where the information indicative of the marking mechanism is associated with an establishment of a traffic flow in accordance with the marking mechanism.

A first network node for wireless communication is described. The first network node may include a memory, and at least one processor coupled to the memory, the at least one processor configured to obtain, from a second network entity, a request for transmission of information indicative of a marking mechanism, where the marking mechanism enables identification of packets that belong to a same PDU set or a same data burst, obtain, in accordance with one or more policy control rules, the information indicative of the marking mechanism, and output, to the second network entity and in accordance with the request, the information indicative of the marking mechanism, where the information indicative of the marking mechanism is associated with an establishment of a traffic flow in accordance with the marking mechanism.

An apparatus for wireless communication at a first network entity is described. The apparatus may include a processor, memory coupled with the processor, and instructions stored in the memory. The instructions may be executable by the processor to cause the apparatus to obtain, from a second network entity, a request for transmission of information indicative of a marking mechanism, where the marking mechanism enables identification of packets that belong to a same PDU set or a same data burst, obtain, in accordance with one or more policy control rules, the information indicative of the marking mechanism, and output, to the second network entity and in accordance with the request, the information indicative of the marking mechanism, where the information indicative of the marking mechanism is associated with an establishment of a traffic flow in accordance with the marking mechanism.

Another apparatus for wireless communication at a first network entity is described. The apparatus may include means for obtaining, from a second network entity, a request for transmission of information indicative of a marking mechanism, where the marking mechanism enables identification of packets that belong to a same PDU set or a same data burst, means for obtaining, in accordance with one or more policy control rules, the information indicative of the marking mechanism, and means for outputting, to the second network entity and in accordance with the request, the information indicative of the marking mechanism, where the information indicative of the marking mechanism is associated with an establishment of a traffic flow in accordance with the marking mechanism.

A non-transitory computer-readable medium having code for wireless communication stored thereon is described. The code, when executed by a first network entity, may cause the first network entity to obtain, from a second network entity, a request for transmission of information indicative of a marking mechanism, where the marking mechanism enables identification of packets that belong to a same PDU set or a same data burst, obtain, in accordance with one or more policy control rules, the information indicative of the marking mechanism, and output, to the second network entity and in accordance with the request, the information indicative of the marking mechanism, where the information indicative of the marking mechanism is associated with an establishment of a traffic flow in accordance with the marking mechanism.

In some examples of the method, apparatuses, and non-transitory computer-readable medium described herein, obtaining the request may include operations, features, means, or instructions for obtaining the request from an AF via a subscription request message, where the second network entity may be the AF.

In some examples of the method, apparatuses, and non-transitory computer-readable medium described herein, the subscription request message includes an event that indicates that the request corresponds to one or both of PDU set marking or data burst marking.

Some examples of the method, apparatuses, and non-transitory computer-readable medium described herein may further include operations, features, means, or instructions for monitoring for the subscription request message based on the event.

In some examples of the method, apparatuses, and non-transitory computer-readable medium described herein, obtaining the request may include operations, features, means, or instructions for obtaining the request from the AF via an NEF and a unified data management function.

In some examples of the method, apparatuses, and non-transitory computer-readable medium described herein, the subscription request message may be an event exposure subscription request message.

Some examples of the method, apparatuses, and non-transitory computer-readable medium described herein may further include operations, features, means, or instructions for obtaining, dynamically, the one or more policy control rules from a PCF during a PDU session establishment or modification, where the one or more policy control rules may be based on one or more marking mechanisms that may be compatible with the first network entity.

In some examples of the method, apparatuses, and non-transitory computer-readable medium described herein, the one or more policy control rules may be predefined at the first network entity and the one or more policy control rules may be based on one or more marking mechanisms that may be compatible with the first network entity.

Some examples of the method, apparatuses, and non-transitory computer-readable medium described herein may further include operations, features, means, or instructions for select a user plane function based on the marking mechanism and configuring the user plane function based on the marking mechanism, where a configuration of the user plane function based on the marking mechanism may be associated with the establishment of the traffic flow in accordance with the marking mechanism.

Some examples of the method, apparatuses, and non-transitory computer-readable medium described herein may further include operations, features, means, or instructions for obtaining, from the user plane function, information indicative of a capability of the user plane function that may be associated with the marking mechanism, where the user plane function may be selected based on the capability of the user plane function.

Some examples of the method, apparatuses, and non-transitory computer-readable medium described herein may further include operations, features, means, or instructions for searching a set of marking mechanism options based on one or more marking mechanisms that may be compatible with the second network entity and identifying the user plane function based on the searching of the set of marking mechanism options, where the user plane function may be identified based on being capable of at least one of the one or more marking mechanisms that may be compatible with the second network entity.

In some examples of the method, apparatuses, and non-transitory computer-readable medium described herein, outputting the information may include operations, features, means, or instructions for outputting the information to an AF via an event exposure notification message, where the second network entity may be the AF.

In some examples of the method, apparatuses, and non-transitory computer-readable medium described herein, the marking mechanism enables identification of PDU sets or data bursts sent by an application server to a user plane function.

In some examples of the method, apparatuses, and non-transitory computer-readable medium described herein, the first network entity may be an SMF and the second network entity may be an AF.

A method of wireless communication performed by a network entity is described. The method may include obtaining, from a core network entity, information indicative of a set of available marking mechanisms for identification of packets that belong to a same PDU set or a same data burst and outputting, to the core network entity, an indication of at least one marking mechanism from the set of available marking mechanisms that corresponds to a policy control rule update for the core network entity.

A first network node for wireless communication is described. The first network node may include a memory, and at least one processor coupled to the memory, the at least one processor configured to obtain, from a core network entity, information indicative of a set of available marking mechanisms for identification of packets that belong to a same PDU set or a same data burst and output, to the core network entity, an indication of at least one marking mechanism from the set of available marking mechanisms that corresponds to a policy control rule update for the core network entity.

An apparatus for wireless communication at a network entity is described. The apparatus may include a processor, memory coupled with the processor, and instructions stored in the memory. The instructions may be executable by the processor to cause the apparatus to obtain, from a core network entity, information indicative of a set of available marking mechanisms for identification of packets that belong to a same PDU set or a same data burst and output, to the core network entity, an indication of at least one marking mechanism from the set of available marking mechanisms that corresponds to a policy control rule update for the core network entity.

Another apparatus for wireless communication at a network entity is described. The apparatus may include means for obtaining, from a core network entity, information indicative of a set of available marking mechanisms for identification of packets that belong to a same PDU set or a same data burst and means for outputting, to the core network entity, an indication of at least one marking mechanism from the set of available marking mechanisms that corresponds to a policy control rule update for the core network entity.

A non-transitory computer-readable medium having code for wireless communication stored thereon is described. The code, when executed by a network entity, may cause the network entity to obtain, from a core network entity, information indicative of a set of available marking mechanisms for identification of packets that belong to a same PDU set or a same data burst and output, to the core network entity, an indication of at least one marking mechanism from the set of available marking mechanisms that corresponds to a policy control rule update for the core network entity.

A method of wireless communication performed by a first network entity is described. The method may include outputting, to a second network entity, information indicative of a set of available marking mechanisms for identification of packets that belong to a same PDU set or a same data burst and obtaining, from the second network entity, an indication of at least one marking mechanism from the set of available marking mechanisms.

A first network node for wireless communication is described. The first network node may include a memory, and at least one processor coupled to the memory, the at least one processor configured to output, to a second network node, information indicative of a set of available marking mechanisms for identification of packets that belong to a same PDU set or a same data burst and obtain, from the second network node, an indication of at least one marking mechanism from the set of available marking mechanisms.

An apparatus for wireless communication at a first network entity is described. The apparatus may include a processor, memory coupled with the processor, and instructions stored in the memory. The instructions may be executable by the processor to cause the apparatus to output, to a second network entity, information indicative of a set of available marking mechanisms for identification of packets that belong to a same PDU set or a same data burst and obtain, from the second network entity, an indication of at least one marking mechanism from the set of available marking mechanisms.

Another apparatus for wireless communication at a first network entity is described. The apparatus may include means for outputting, to a second network entity, information indicative of a set of available marking mechanisms for identification of packets that belong to a same PDU set or a same data burst and means for obtaining, from the second network entity, an indication of at least one marking mechanism from the set of available marking mechanisms.

A non-transitory computer-readable medium having code for wireless communication stored thereon is described. The code, when executed by a first network entity, may cause the network entity to output, to a second network entity, information indicative of a set of available marking mechanisms for identification of packets that belong to a same PDU set or a same data burst and obtain, from the second network entity, an indication of at least one marking mechanism from the set of available marking mechanisms.

DETAILED DESCRIPTION

Figure 1:
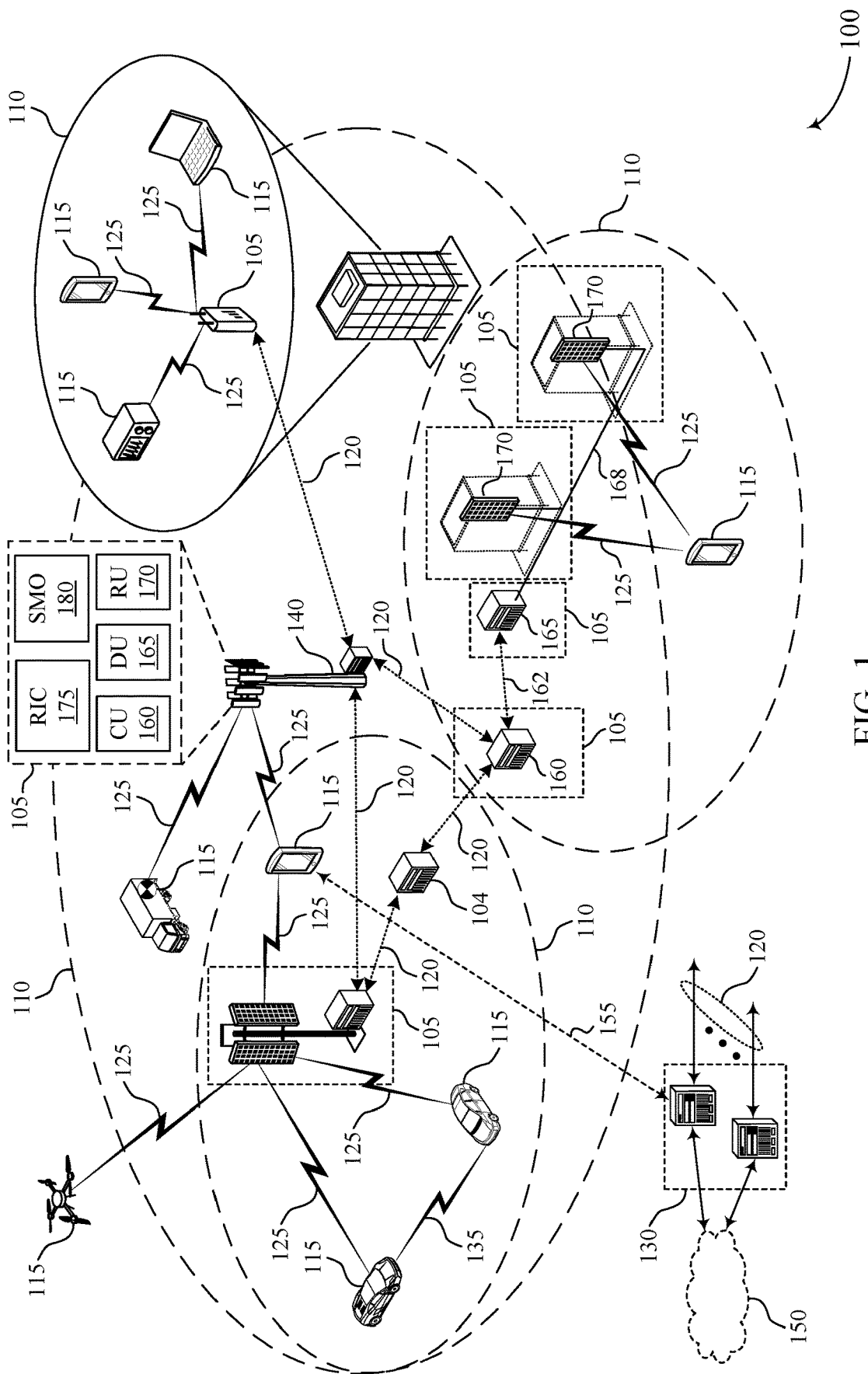
FIG. 1 shows an example of a wireless communications system that supports negotiation and notification of protocol data unit (PDU) set or data burst marking mechanisms in accordance with one or more aspects of the present disclosure.

In some wireless communications systems, one or more network entities or functionalities may support an extended reality and media (XRM) application according to which the one or more network entities or functionalities may process and prepare one or more data packets, such as protocol data units (PDUs), for transmission to a user equipment (UE). In some cases, the one or more network entities or functionalities may process and prepare the one or more data packets on a packet-by-packet basis. In other words, the one or more network entities or functionalities may process and prepare each data packet individually. For example, an application server (AS) entity may send a single packet to a user plane function (UPF), which may send the single packet to a radio access network (RAN), which may transmit the single packet to a UE, or vice versa. In some other cases, the one or more network entities or functionalities may extend a data packet processing and preparation framework to handle a set or a burst of multiple packets together (such that the set of multiple packets are sent together, at a same time, at approximately the same time, or in a short period of time). In accordance with handling multiple packets together, where the multiple packets may collectively indicate one or more units of information, the RAN may obtain more complete insight into the data traffic between the AS and the UE, which may enable the RAN to allocate resources for packet transmissions between the RAN and the UE more efficiently.

To support such a handling of multiple packets together, which may be grouped by one or both of PDU sets or data bursts (e.g., a PDU burst), the one or more network entities or functionalities may use a marking mechanism according to which a packet can be marked to identify its belonging to a specific PDU set or data burst. In some deployments, various types of marking mechanisms may be used. In some systems, however, the one or more network entities or functionalities may lack a signaling- or configuration-based mechanism that ensures the one or more network entities or functionalities use or expect a same marking mechanism. As such, different network entities or functionalities may potentially use or expect different marking mechanisms, which may lead to interoperability issues between, for example, a 5G system (5GS) and an application function (AF) or the AS.

In some implementations of the present disclosure, one or more network entities or functionalities may support a mutually understood procedure to support synchronization between the one or more network entities or functionalities as to which specific marking mechanism is to be used for a traffic flow that involves one or both of PDU sets or data bursts. In some implementations, for example, the one or more network entities or functionalities may select, identify, or otherwise determine which specific marking mechanism is to be used for a traffic flow in accordance with a two-step procedure. In some aspects, the two-step procedure may include a first step associated with a negotiation of PDU set or data burst marking mechanisms between an AF and a core network and a second step associated with a notification of a selected PDU set or data burst marking mechanism from a session management function (SMF) to the AF. In accordance with the first step, the AF may subscribe to the core network to obtain a set of marking mechanisms that is available for the traffic flow, the AF may indicate a subset of one or more marking mechanisms (e.g., a set of one or more marking mechanisms that are suitable to or otherwise preferred by the AF) to a policy control function (PCF), and the PCF may update one or more policy control rules based on at least one marking mechanism of the subset of one or more marking mechanisms. In accordance with the second step, the AF may subscribe to the SMF for a notification of a selected marking mechanism, the SMF may retrieve and select a marking mechanism (and select a UPF based on the selected marking mechanism), the SMF may indicate the selected marking mechanism to the AF, and the AF may forward an indication of the selected marking mechanism to the AS. In some aspects, the SMF may indicate multiple selected marking mechanisms. For example, the SMF may indicate, to the AF and AS, a first marking mechanism for identification of packets belonging to a same PDU burst and a second marking mechanism for identification of packets belonging to a same data burst.

Particular implementations of the subject matter described in this disclosure can be implemented to realize one or more of the following potential advantages. For example, as a result of implementing the described procedure, an AF and a system, such as a 5GS, may negotiate and use multiple different options to mark PDU sets or data bursts sent between an AS and a UPF. Further, the 5GS and the AF or AS may avoid or prevent interoperability issues between the 5GS and the AF or AS by maintaining synchronization between the 5GS and the AF or AS on which marking mechanism various network entities or functionalities use to exchange PDU set- or data burst-related metadata between the AS and the UPF, which may increase a likelihood for successful communication of data packets between network entities or functionalities (and, ultimately, between a UE and the AS). As such, a UE and the network may achieve higher data rates, greater spectral efficiency, lower latency, and greater system capacity, among other benefits.

Aspects of the disclosure are initially described in the context of wireless communications systems. Aspects of the disclosure are additionally illustrated by and described with reference to a network diagram, process flows, and a header format. Aspects of the disclosure are further illustrated by and described with reference to apparatus diagrams, system diagrams, and flowcharts that relate to negotiation and notification of PDU set or data burst marking mechanisms.

FIG. 1 illustrates an example of a wireless communications system 100 that supports negotiation and notification of PDU set or data burst marking mechanisms in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, an RU 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), an RRU, or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support negotiation and notification of PDU set or data burst marking mechanisms as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz may be referred to as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In some systems, such as the wireless communications system 100, one or more network entities 105 or functionalities may extend a data packet processing and preparation framework to handle a set or a burst of multiple packets together (such that the set of multiple packets are sent together, at a same time, at approximately the same time, in a short period of time). In accordance with handling multiple packets together, where the multiple packets may collectively indicate one or more units of information, the RAN may obtain more complete insight into the data traffic between the AS and a UE 115, which may enable the RAN to allocate resources for packet transmissions between the RAN and the UE 115 more efficiently.

To support such a handling of multiple packets together, which may be grouped by one or both of PDU sets or data bursts (e.g., a PDU burst or a burst of PDU data packets), the one or more network entities 105 or functionalities may use a marking mechanism according to which a packet can be marked to identify its belonging to a specific PDU set or data burst. In some deployments, various types of marking mechanisms may be used. In some systems, however, the one or more network entities 105 or functionalities may lack a signaling- or configuration-based mechanism that ensures the one or more network entities or functionalities use or expect a same marking mechanism. As such, different network entities 105 or functionalities may use or expect different marking mechanisms, which may lead to interoperability issues between, for example, a 5GS and an AF or the AS.

In some implementations, one or more network entities 105 or functionalities may support a mutually understood procedure to support synchronization between the one or more network entities 105 or functionalities as to which specific marking mechanism is to be used for a traffic flow that involves one or both of PDU sets or data bursts. In some implementations, for example, the one or more network entities 105 or functionalities may select, identify, or otherwise determine which specific marking mechanism is to be used for a traffic flow in accordance with a two-step procedure. In some aspects, the two-step procedure may include a first step associated with a negotiation of PDU set or data burst marking mechanisms between an AF and a core network and a second step associated with a notification of a selected PDU set or data burst marking mechanism from an SMF to an AF.

In accordance with the first step, an AF may subscribe to a core network to obtain a set of marking mechanisms that is available for the traffic flow, the AF may indicate a set of one or more marking mechanisms (e.g., a set of one or more marking mechanisms that are suitable to the AF) to a PCF, and the PCF may update one or more policy control rules based on the set of one or more marking mechanisms. In accordance with the second step, the AF may subscribe to an SMF for a selected marking mechanism (e.g., for one or more selected marking mechanisms), the SMF may retrieve the selected marking mechanism and select a UPF based on the selected marking mechanism, the SMF may indicate the selected marking mechanism to the AF, and the AF may forward an indication of the selected marking mechanism to an AS. As such, the AS may exchange a set or burst of PDUs with a UE 115 via the UPF and the RAN in accordance with the selected marking mechanism, where each of the AS, the UPF, and the RAN may expect to use the selected marking mechanism in accordance with the two-step procedure.

Figure 2:
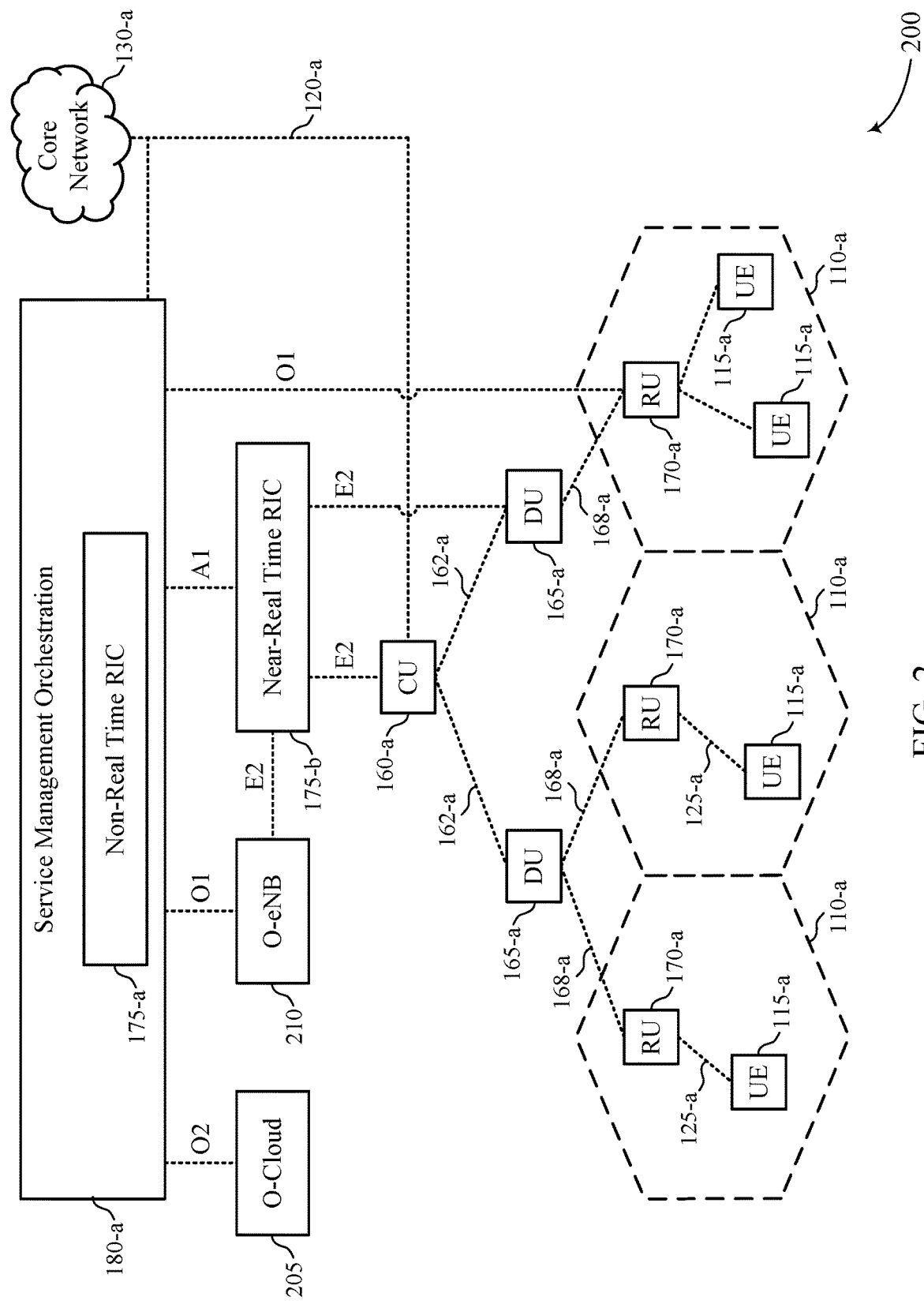
FIG. 2 shows an example of a network architecture that supports negotiation and notification of PDU set or data burst marking mechanisms in accordance with one or more aspects of the present disclosure

FIG. 2 illustrates an example of a network architecture 200 that (e.g., a disaggregated base station architecture, a disaggregated RAN architecture) that supports negotiation and notification of PDU set or data burst marking mechanisms in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) based on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g. via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

In accordance with implementations described herein, one or more network entities 105 or functionalities may support a negotiation and notification signaling mechanism to achieve a same understanding of a marking mechanism that is to be used for sets or bursts of PDUs (e.g., data or data packets). In some implementations, the one or more network entities 105 or functionalities may such negotiation and notification in accordance with architectural-level configuration or signaling designs. For example, in accordance with implementations described herein, an AS-UPF interface may provide greater data rates and experience higher communication efficiency as a result of synchronizing on a specific or particular marking mechanism that is to be used for identifying that packets (e.g., PDUs) belong to a same PDU set or a same data burst.

Figure 3:
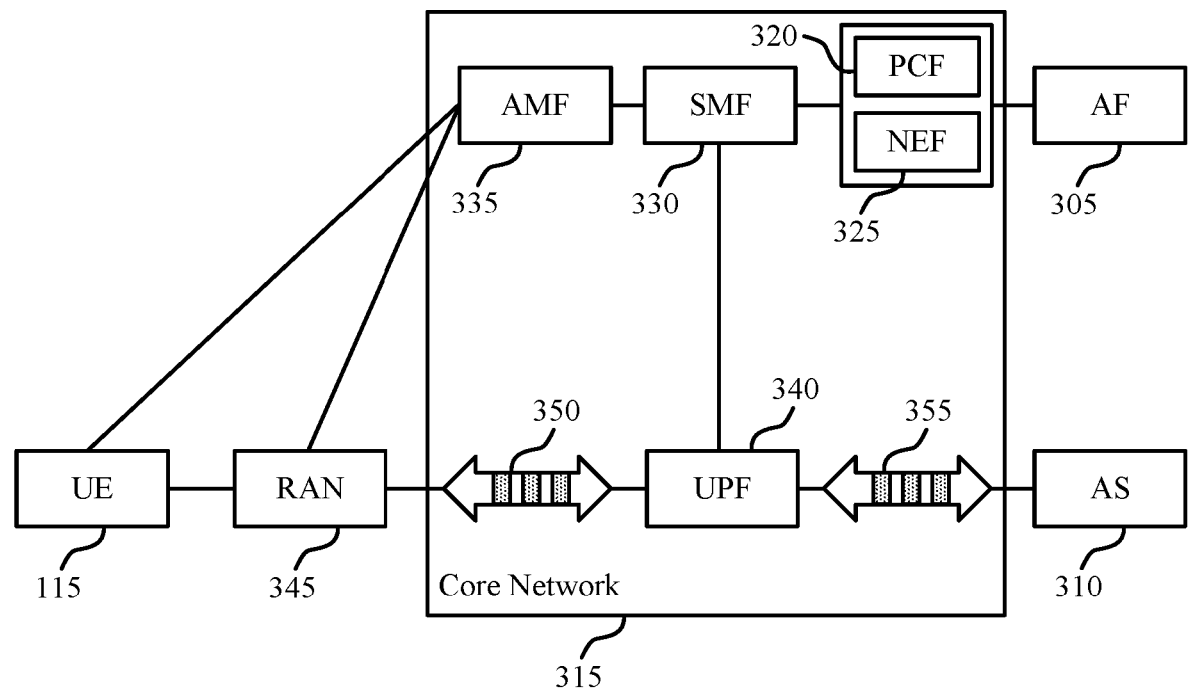
FIG. 3 shows an example of a network diagram that supports negotiation and notification of PDU set or data burst marking mechanisms in accordance with one or more aspects of the present disclosure.

FIG. 3 illustrates an example of a network diagram 300 that supports negotiation and notification of PDU set or data burst marking mechanisms in accordance with one or more aspects of the present disclosure. The network diagram 300 may implement or be implemented to realize aspects of the wireless communications system 100 or the network architecture 200. For example, the network diagram 300 illustrates communication between various network entities 105 or network functionalities and a UE 115, which may be examples of corresponding devices as described herein, including with reference to FIGS. 1 and 2. In some implementations, the various network entities 105 or functionalities may support a two-step procedure according to which one or more of the network entities 105 or functionalities may maintain synchronization relating to which marking mechanism, of a set of multiple marking mechanisms, is to be used for a traffic flow between an AS 310 and a UE 115. The various network entities 105 or functionalities illustrated by the network diagram 300 include an AF 305, an AS 310, a core network 315 (which may be an example of a 5G core network), a PCF 320, a network exposure function (NEF) 325, an SMF 330, an access and mobility function (AMF) 335, a UPF 340, a RAN 345 (which may be an example of or located at a base station 140), and a UE 115.

In some aspects, the network diagram 300 may support or otherwise enable per PDU set or per data burst integrated packet handling. For example, the AS 310 and the UPF 340 may exchange (e.g., transmit or receive) a set of one or more PDUs 355 (e.g., data packets) together or as a group for simultaneous (or approximately simultaneous) processing or handling. In some examples, for instance, the AS 310 may transmit the set of one or more PDUs 355 together, at the same time, at approximately the same time, or in a short period of time and the set of one or more PDUs 355 may collectively indicate or convey one or more units of information. The AS 310 may transmit the set of one or more PDUs 355 to the UPF 340 over an N6 interface. As used herein, "a short period of time" may refer to a period of time less than N milliseconds, where N is a positive number. In some aspects, N may be less than or equal to 5, 2.5, 1, 0.5, 0.1, 0.05, or 0.01, for example.

The UPF 340 may generate another set of one or more PDUs 350 (e.g., data packets) together or as a group for simultaneous (or approximately simultaneous) processing or handling to be exchanged with the RAN 345 and the UE 115. In some aspects, the UPF 340 may mark the set of one or more PDUs 350 independently of how the AS 310 marks the set of one or more PDUs 355. For example, the set of one or more PDUs 355 may be associated with a first marking mechanism and the set of one or more PDUs 350 may be associated with a second marking mechanism, where the first marking mechanism may be different from or the same as the second marking mechanism (even if the set of one or more PDUs 355 may be associated with a first marking mechanism and the set of one or more PDUs 350 include same data or information). In other words, the AS-provided metadata and the UPF-provided metadata may be independent. For example, the AS-provided metadata and the UPF-provided metadata may or may not coincide. Further, the set of one or more PDUs 355 is described herein to generally refer to one or more PDUs and, as such, a PDU of the set of one or more PDUs 355 may belong to one or both of a PDU set or a data burst.

Further, the network diagram 300 (specifically, the AS 310 and the UPF 340) may support different options for how to indicate metadata related to a marking of (e.g., a grouping of) the set of one or more PDUs 355 by the AS 310 and the UPF 340. The different marking options may include a no-marking mechanism, a real-time transport protocol (RTP) header based marking mechanism, a secure real-time transport protocol (SRTP) header based marking mechanism, a web real-time communication (WebRTC) based marking mechanism, or a dynamic adaptive streaming over hypertext transfer protocol (HTTP) (DASH) based marking mechanism, an implementation dependent marking mechanism, among other examples. In some aspects, both the AS 310 and the UPF 340 may use a marking mechanism when transmitting or receiving the set of one or more PDUs 355.

As an example for PDU set marking, for RTP (which may be associated with an unencrypted header and payload), a set of parameters may be configured to indicate information associated with (e.g., a classification or marking of) a PDU set. For example, if an NAL I flag is set to 1, a PDU priority mark (PPM) may be equal to or associated with a relatively high importance. For further example, NAL priority field values set for enhanced layers may be mapped to a PPM based on an application preference for motion or quality. If no configuration applies, the PPM may be equal to or associated with a relatively low importance by default. Additional details relating to an RTP header format for marking PDUs are illustrated by and described with reference to FIG. 7.

As another example for PDU set marking, for SRTP that is associated with an unencrypted extended experimental header and an encrypted payload, a set of parameters may be configured to indicate information associated with (e.g., a classification or marking of) a PDU set. In some aspects, the parameters configured may be based on an RTP extension header. For example, if an I flag is set to 1, the PPM may be equal to or associated with a relatively high importance and, if a D flag is set to 1, the PPM may be equal to or associated with a relatively low importance. Further, temporal ID (TID), layer ID (LID), or temporal layer 0 picture index (TL0PICIDX) values may be mapped to a PPM based on an application preference for motion or quality. If no configuration applies, the PPM may be equal to or associated with a relatively low importance by default.

As another example for PDU set marking, for SRTP that is associated with an unencrypted header and an encrypted payload, a set of parameters may be configured to indicate information associated with (e.g., a classification or marking of) a PDU set. The configured parameters may include one or more of internet protocol version 6 (IPv6) flow label values corresponding to an application preference for importance of a PDU, a differentiated services code point (DSCP) corresponding to an application preference for importance of a PDU (e.g., if DSCP=d1, PPM may be equal to or associated with a relatively high importance, or a sending internet protocol (IP) port and corresponding importance in PPM (e.g., if sending port=p1, PPM may be equal to or associated with a medium importance). If no configuration applies, the PPM may be equal to or associated with a relatively low importance by default.

As another example for PDU set marking, the AF 305 and the core network 315 may negotiate to apply no marking. In such examples, the UPF 340 may generate the marking of (e.g., grouping of) the set of one or more PDUs 355 based on local mechanisms, such as deep packet inspection or machine learning, without using marking from the AS 310. As such, while the UPF 340 marks packets for the RAN 345, marking between the AF 305 or the AS 310 and the UPF 340 may be optional.

For data burst marking, a set of one or more burst awareness fields may be updated or set to specific values to indicate that a DPU belongs to or is a part of a specific burst. In some aspects, the set of burst awareness fields may include a burst service flow flag and a last PDU of the burst flag. In some other aspects, the set of burst awareness fields may include a burst service flow flag, a burst sequence number, a last PDU of the burst flag or a number of IP packets in the burst, and an IP sequence number in the burst.

The network diagram 300 may use a marking mechanism to group the set of one or more PDUs 355 in accordance with a PDU set or a data burst. A PDU set may include one or more PDUs that carry a payload of one unit of information generated at an application level (e.g., a frame or video slice for an XRM service). The one or more PDUs in the data burst may be associated with a same importance (e.g., a same importance constraint) at an application layer. As such, in some aspects, the application layer may use all PDUs in a PDU set to use the corresponding unit of information (and may be unable to use the corresponding unit of information if at least one PDU of the PDU set is missing). In some other aspects, the application layer may still recover parts of the corresponding information unit if some PDUs of the PDU set are missing. A data burst may be a set of multiple PDUs that may be larger than a single PDU set. As such, a data burst may include more than one PDU set and, accordingly, convey more than one unit of information. In other words, a (data) burst may represent a group of packets that are generated by an application at approximately a same time and the packets making up the burst may not be associated with a concept of "importance" and may not be associated with a constraint involving reception of all data in the burst for successful processing (which may be specific to PDU sets). In some aspects, (data) burst information may be implicitly conveyed or supported by one or more network entities 105 or functionalities in accordance with signaling or configuration of information associated with the parameters defined by Table 1, shown below.

TABLE 1

TSC Assistance Information

| Assistance Information | Description |
| --- | --- |
| Flow Direction | The direction of the time sensitive communication (TSC) flow (uplink or downlink). |
| Periodicity | Refers to the time period between start of two data bursts. |
| Burst Arrival Time (optional) | The latest possible time when the first packet of the data burst arrives at either the ingress of the RAN (downlink flow direction) or the egress interface of the UE (uplink flow direction). |
| Survival Time (optional) | Survival Time may be synonymous with the time period an application can survive without any data burst. |

In order to prevent interoperability issues between a system (e.g., a 5GS) and the AF 305 or the AS 310, the AF 305 or the AS 310 and the system may be in sync on which protocol or details are used to exchange PDU set- or data burst-related metadata between the AS 310 and the UPF 340. Such a synchronization between the AF 305 or the AS 310 and the system may be associated with setting policies in the system (e.g., the 5GS) for which protocol (e.g., which marking mechanism) to use for PDU set or data burst information between the AS 310 and the system in with application support. Such policies may be arranged offline (e.g., via a service level agreement (SLA)) or via explicit signaling. Additionally, or alternatively, such a synchronization between the AF 305 or the AS 310 and the system may be associated with PDU session establishment updates that account for a selected protocol (e.g., a selected marking mechanism) for PDU set or data burst information. Additionally, or alternatively, such a synchronization between the AF 305 or the AS 310 and the system may be associated with system exposure or confirmation, or both, to the AF 305 that a given protocol (e.g., a given marking mechanism) is available to be used for a traffic flow (e.g., an XRM traffic flow).

In accordance with the implementations described herein, one or more network entities 105 or functionalities of the network diagram 300 may employ a two-step procedure according to which the AF 305 and the core network 315 may negotiate on a set of available or suitable marking mechanisms for one or both of PDU sets or data bursts and according to which the SMF 330 may notify the AF 305 of a selected marking mechanism for one or both of PDU sets or data bursts. Additional details relating to the negotiation on the set of available or suitable marking mechanisms between the AF 305 and the core network 315 are illustrated by and described with reference to FIGS. 4 and 5. Additional details relating to the notification from the SMF 330 to the AF 305 of the selected marking mechanism are illustrated by and described with reference to FIG. 6. In some aspects, the SMF 330 may indicate multiple selected marking mechanisms. For example, the SMF 330 may indicate, to the AF 305 and AS 310, a first marking mechanism for identification of packets belonging to a same PDU burst and a second marking mechanism for identification of packets belonging to a same data burst. In such aspects, the AS 310 and the UPF 340 may use a single respective marking mechanism for PDU set marking and a single respective marking mechanism for data burst marking and the SMF 330 may indicate both respective marking mechanisms to the AF 305.

In some systems, one or more network entities 105 or functionalities may use a packet flow description (PFD) as a basis for communication from the AF 305 to a unified data repository (UDR). For example, the SMF 330 may subscribe to PFDManagement services from the NEF 325 to retrieve a configuration and the SMF 330 may use an N4 PFD management procedure to provision one or more PDFs in the UPF 340. As such, details of a PDU set marking sent over the AS-UPF interface may be provided together with the PFD to map the different PDU set traffic over the different quality of service (QoS) flows. In some implementations, an identification of a beginning or end of each PDU set or burst and a mapping of PDU set or burst traffic over a QoS flow may be associated with separate signaling mechanisms or separate rules or procedures. Further, in some implementations, the use of a PDU set marking may be authorized by a policy control rule and an actual marking option to be used may be part of the PFD. In such implementations, the network diagram 300 may still support a route of AF 305 to NEF 325 to UDR and the AF 305 may use this route for requesting one or more PDU set or burst marking options.

Further, as described herein, the term "output" may generally refer to any method or means for outputting information, including, for example, transmitting, signaling, messaging, conveying, indicating, and the like. Further, outputting may include outputting via wireless signaling, via wired signaling, or via a combination of wired and wireless signaling. Similarly, as described herein, the term "obtain" may generally refer to any method or means for obtaining information, including, for example, receiving, sensing, extracting, measuring, and the like. Further, obtaining may include obtaining via wireless signaling, via wired signaling, or via a combination of wired and wireless signaling.

Figure 4:
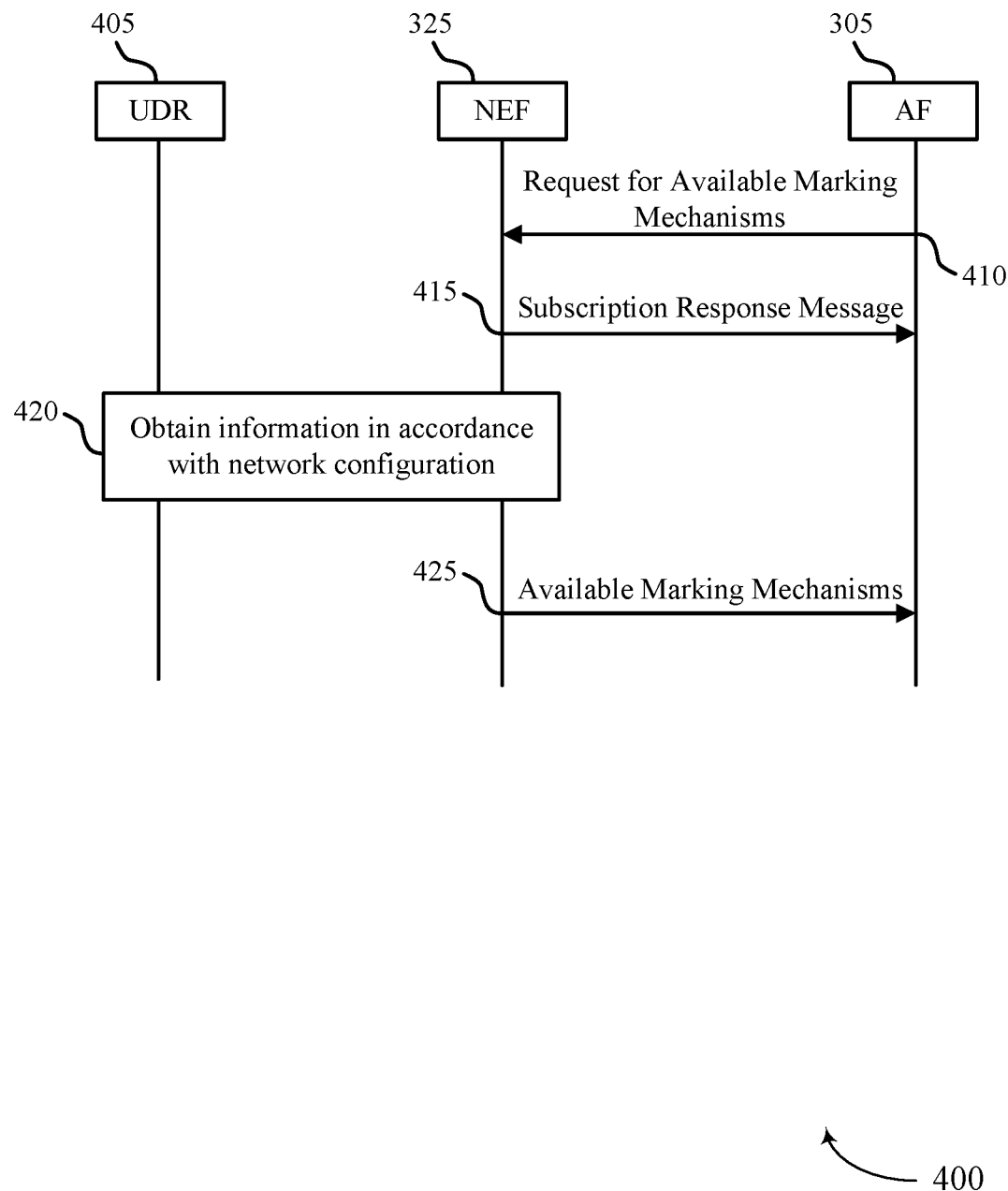
FIGS. 4 through 6 show examples of process flows that support negotiation and notification of PDU set or data burst marking mechanisms in accordance with one or more aspects of the present disclosure.

FIG. 4 shows an example of a process flow 400 that supports negotiation and notification of PDU set or data burst marking mechanisms in accordance with one or more aspects of the present disclosure. The process flow 400 may implement aspects of the wireless communications system 100, the network architecture 200, and the network diagram 300. For example, the process flow 400 illustrates communication between the AF 305, the NEF 325, and a UDR 405. In some implementations, the AF 305, the NEF 325, and the UDR 405 may communicate to negotiate a set of available or suitable marking mechanisms between the AF 305 and the core network 315 (which may include one or both of the NEF 325 and the UDR 405). In other words, the process flow 400 illustrates AF 305-NEF 325 interaction.

In the following description of the process flow 400, the operations may be performed (such as reported or provided) in a different order than the order shown, or the operations performed by the example devices may be performed in different orders or at different times. Some operations also may be left out of the process flow 400, or other operations may be added to the process flow 400. Further, although some operations or signaling may be shown to occur at different times for discussion purposes, these operations may actually occur at the same time.

At 410, the AF 305 may output, to the NEF 325, a request for a notification of a set of available marking mechanisms associated with one or both of marking PDUs in a PDU set (e.g., PDU set marking) or marking PDUs in a data burst (e.g., data burst marking). In some aspects, each respective marking mechanism of the set of available marking mechanisms corresponds to a respective manner of identifying a set of one or more PDUs that, collectively, convey one or more units of information. In some implementations, the AF 305 may output the request via a subscription request message, such as an event exposure subscription request message. For example, the AF 305 may output the request via an Nnef_EventExposure_Subscribe request message.

In some implementations, the AF 305 may include an event (e.g., an event identifier, an event filter, or an event field) in the subscription request message and may set a value of the event based on the subscription request message including the request for the notification of the set of available marking mechanisms. For example, the event that the AF 305 includes in the subscription request message may be associated with one or both of the PDU set marking or the data burst marking. In other words, the AF 305 may set the event such that the event='PDU set marking mechanism' or 'burst marking mechanism' or 'PDU set and burst marking mechanisms.' In accordance with outputting the subscription request message to the NEF 325, the AF 305 may effectively subscribe to the core network 315 (e.g., a 5G core network) to obtain a list of options that the system (e.g., a 5GS) supports.

At 415, the NEF 325 may output, to the AF 305, a subscription response message. In some examples, the subscription response message may confirm or acknowledge the subscription of the AF 305 to the NEF 325 or the core network 315. In some aspects, the subscription response message may be an example of an Nnef_EventExposure_Subscribe response message.

At 420, the NEF 325 may obtain, in accordance with a network configuration, the set of available marking mechanisms. In some implementations, the NEF 325 may obtain the set of available marking mechanisms from one or more of a memory of the NEF 325 or the core network 315, the UDR 405, or an operations, administration, and maintenance (OAM) entity. For example, the NEF 325 may store or retrieve the set of available marking mechanisms for PDU set marking (e.g., RTP, SRTP, etc.) or for burst marking (e.g., different mechanisms or techniques for setting burst awareness fields).

At 425, the NEF 325 may output, to the AF 305, an indication of the set of available marking mechanisms in accordance with the request. In other words, the NEF 325 may store or retrieve the set of available marking mechanisms for PDU set marking or for burst marking and may expose the set of available marking mechanisms to the AF 305. In some implementations, the NEF 325 may output the indication of the set of available marking mechanisms to the AF 305 via a notification message, such as an event exposure notification message. For example, the NEF 325 may output the indication of the set of available marking mechanisms to the AF 305 via an Nnef_EventExposure_Notify message.

As such, the AF 305 may obtain information associated with the marking mechanism options that are supported by the system (e.g., the 5GS). In some implementations, the AF 305 may use this information to select or identify one or more marking mechanisms, from the set of available marking mechanisms, that are suitable for the AF 305 or a traffic flow to be communicated from the AS 310 to the core network 315 and to a UE 115. Additional details relating to the selection of one or more marking mechanisms from the set of available marking mechanisms by the AF 305 and a notification of the selected one or more marking mechanisms from the AF 305 to one or more other network entities 105 or functionalities are illustrated by and described with reference to FIG. 5.

Further, and as also illustrated by and described in more detail with reference to FIG. 5, the AF 305 may obtain information generally indicative of the marking mechanism options from the core network 315 without transmitting a request to the core network 315. For example, the core network 315 may provide (such as transmit or otherwise expose or indicate) of core network capabilities to the AF 305 and the AF 305 may identify, select ascertain, or otherwise determine which one or more marking mechanisms can be used based on the core network capabilities.

Figure 5:
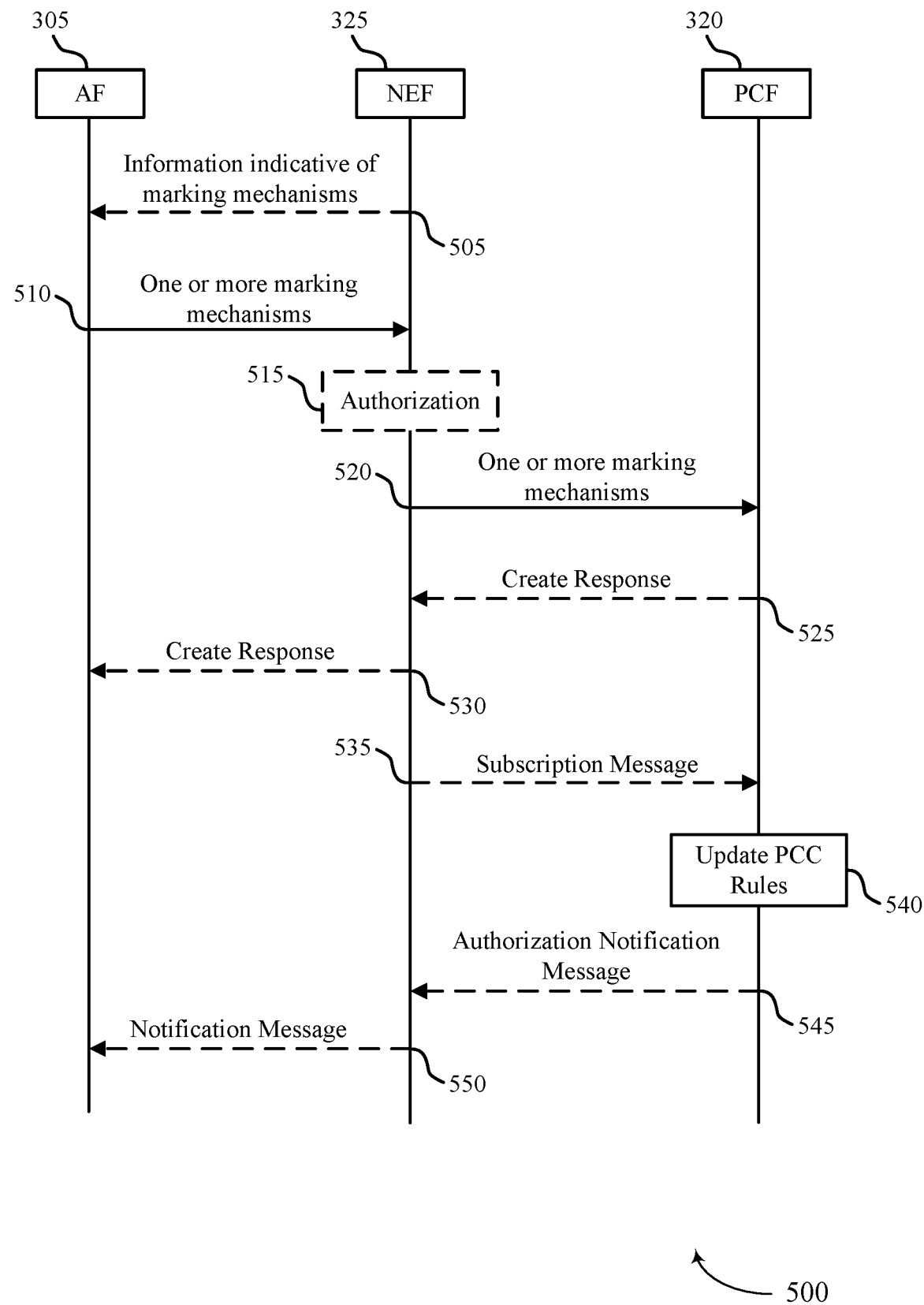

FIG. 5 shows an example of a process flow 500 that supports negotiation and notification of PDU set or data burst marking mechanisms in accordance with one or more aspects of the present disclosure. The process flow 500 may implement aspects of the wireless communications system 100, the network architecture 200, the network diagram 300, or the process flow 400. For example, the process flow 500 illustrates communication between the AF 305, the NEF 325, and the PCF 320. In some implementations, the AF 305, the NEF 325, and the PCF 320 may communicate a notification of one or more preferred marking mechanisms, from the set of available marking mechanisms, that are selected by the AF 305 (e.g., that are suitable to the AF 305). In other words, the process flow 500 illustrates AF 305 to PCF 320 interaction for notification of one or more marking mechanisms that are preferred by the AF 305 to the PCF 320. In some aspects, the process flow 500 may be associated with a setting up of an AF session with a specific QoS procedure.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time.

At 505, the NEF 325 (or another entity of the core network 315) may output, to the AF 305, information indicative of a set of available marking mechanisms. In some aspects, such information may include capability information associated with the core network 315. In such aspects, the capability information may explicitly indicate the set of available marking mechanisms (via one or more dedicated fields) or may implicitly indicate the set of available marking mechanisms (such as via a general indication of core network capabilities). In some implementations, the NEF 325 (or another entity of the core network 315) may provide the information indicative of the set of available marking mechanisms without receiving a request for the information from the AF 305. For example, the NEF 325 (or another entity of the core network 315) and the AF 305 may support a capability exposure procedure via which the AF 305 may receive, obtain, identify, ascertain, or otherwise determine a capability of the core network 315, which may be explicitly or implicitly indicative of the set of available marking mechanisms.

At 510, the AF 305 may output, to the NEF 325 (e.g., a function, entity, or component of the core network 315), an indication of a set of one or more marking mechanisms (such as at least one marking mechanism) from the set of available marking mechanisms. In some aspects, the indication of the set of one or more marking mechanisms may be associated with (e.g., corresponds to or implies) a policy control rule update at the PCF 320 (e.g., at the core network 315).

At 515, the NEF 325 may perform an authorization. In some aspects, the authorization may be associated with authorizing the AF 305 or communication between the core network 315 and the AF 305.

At 520, the NEF 325 may output, to the PCF 320 (e.g., another function, entity, or component of the core network 315), an indication of the one or more marking mechanisms. As such, the NEF 325 may relay the indication of the set of one or more marking mechanisms from the AF 305 to the PCF 320. In other words, the AF 305 may output the indication of the set of one or more marking mechanisms to the PCF via the NEF 325, where the NEF 325 relays the indication of the set of one or more marking mechanisms to the PCF 320.

At 525, the PCF 320 may output, to the NEF 325, a create response message. In some aspects, the create response message may be an example of a Npcf_PolicyAuthorization_Create response message.

At 530, the NEF 325 may output, to the AF 305, a create response message. In some aspects, the create response message may be an example of a Nnef_AFsessionWithQoS_Create response message.

At 535, the NEF 325 may output, to the PCF 320, a subscription message.

In some aspects, the subscription message may be an example of a Npcf_PolicyAuthorization_Subscribe message.

At 540, the PCF 320 may update a policy control rule associated with the PDU set marking or the data burst marking in accordance with at least one of the set of one or more marking mechanisms indicated from the NEF 325 (and originally indicated from the AF 305). For example, the AF 305 may indicate, to the PCF 320, one or more marking mechanism options that the AF 305 expects to be suitable for the AF 305 (or for a traffic flow to be communicated from the AS 310 to the core network 315 and to a UE 115) and the PCF 320 may update one or more policy control rules accordingly. For example, the PCF 320 may update one or more policy and/or charging control (PCC) rules, where a PCC rule may refer to or include a set of information enabling the detection of a service data flow and providing parameters for policy control or charging control, or both.

In some implementations, the PCF 320 may include, in a set of PCC rules supported by the PCF 320, a PCC rule associated with an information name of PDU set marking mechanism(s) or burst marking mechanism(s), or both, and a description associated with the PCC rule may indicate that the PCC rule is for PDU set marking mechanism(s) or burst marking mechanism(s) that the AF 305 has indicated to the PCF 320. Accordingly, the PCF 320 may be permitted to modify the PCC rule for a dynamic PCC rule (e.g., a dynamic PCC rule in the SMF 330). Additional details associated with various PCC rules that the PCF 320 may support are illustrated by Table 2, shown below. As such, the PCF 320 may, in accordance with a configured behavior, fill in PCC rules based on AF-preferred PDU set or burst marking options.

TABLE 2

PCC Rule Information in 5G Core Network

| Information name | Description | Category | PCF permitted to modify for a dynamic PCC rule in the SMF |
|---|---|---|---|
| Rule Identifier | Uniquely identifies the PCC rule, within a PDU session. It is used between PCF and SMF for referencing PCC rules. | Mandatory | No |
| Policy Control | This part defines how to apply policy control for the service data flow. | | |
| Gate status | The gate status indicates whether the service data flow, detected by the service data flow template, may pass (Gate is open) or may be discarded (Gate is closed). | | Yes |
| 5G QoS Identifier (5QI) | The 5QI authorized for the service data flow | Conditional | Yes |
| Disable UE notifications at changes related to Alternate QoS Profiles | Indicates to disable QoS Flow parameters signaling to the UE when the SMF is notified by the NG-RAN of changes in the fulfilled QoS situation. The fulfilled situation is either the QoS profile or an Alternative QoS Profile. | Conditional | Yes |
| PDU Set or burst marking mechanism(s) | PDU Set or burst marking option(s) that the AF has indicated to the PCF. | | Yes |

At 545, the PCF 320 may output, to the NEF 325, an authorization notification message. In some aspects, the authorization notification message may be an example of an Npcf_PolicyAuthorization_Notify message.

At 550, the NEF 325 may output, to the AF 305, a notification message. In some aspects, the notification message may be an example of an Nnef_AFsessionWithQoS_Notify message.

As such, the AF 305 may indicate, to the PCF 320, the set of one or more marking mechanisms that are suitable to the AF 305 and the PCF 320 may update one or more PCC rules accordingly. In addition, or as an alternative, to the AF 305 subscribing to obtain the options for PDU set or burst marking and indicating select options to the PCF 320, one or more PDU set or burst marking settings may be pre-configured or pre-agreed at one or more network entities 105 or functionalities. For example, one or more PCC rules describing the options of how to mark PDU sets or bursts between the AS 310 and the UPF 340 may be pre-configured in the PCF 320 and, as such, the AF 305 and the PCF 320 may refrain from exchanging signaling associated with the one or more marking mechanisms selected by the AF 305. In such examples, the one or more PCC rules may be pre-configured in the PCF 320 per data network name (DNN), per single network slice selection assistance information (S-NSSAI), per AF ID, based on a flow description, etc.).

In accordance with obtaining PCC rules at the PCF 320 that are associated with available, supported, or suitable marking mechanisms (in accordance with the signaling mechanisms of the process flow 400 and the process flow 500 or in accordance with a pre-configuration), the SMF 330 may select a specific marking mechanism for use in marking PDUs sent from the AS 310 to the UPF 340 (and ultimately to a UE 115). To achieve synchronization between the core network 315 (of which the SMF 330 may be a function, entity, or component) and the AF 305 and AS 310, the AF 305 may request a notification of which marking mechanism the SMF 330 selects. Additional details relating to such a notification of a selected marking mechanism (e.g., a selected marking option or method) are illustrated by and described with reference to FIG. 6.

Figure 6:
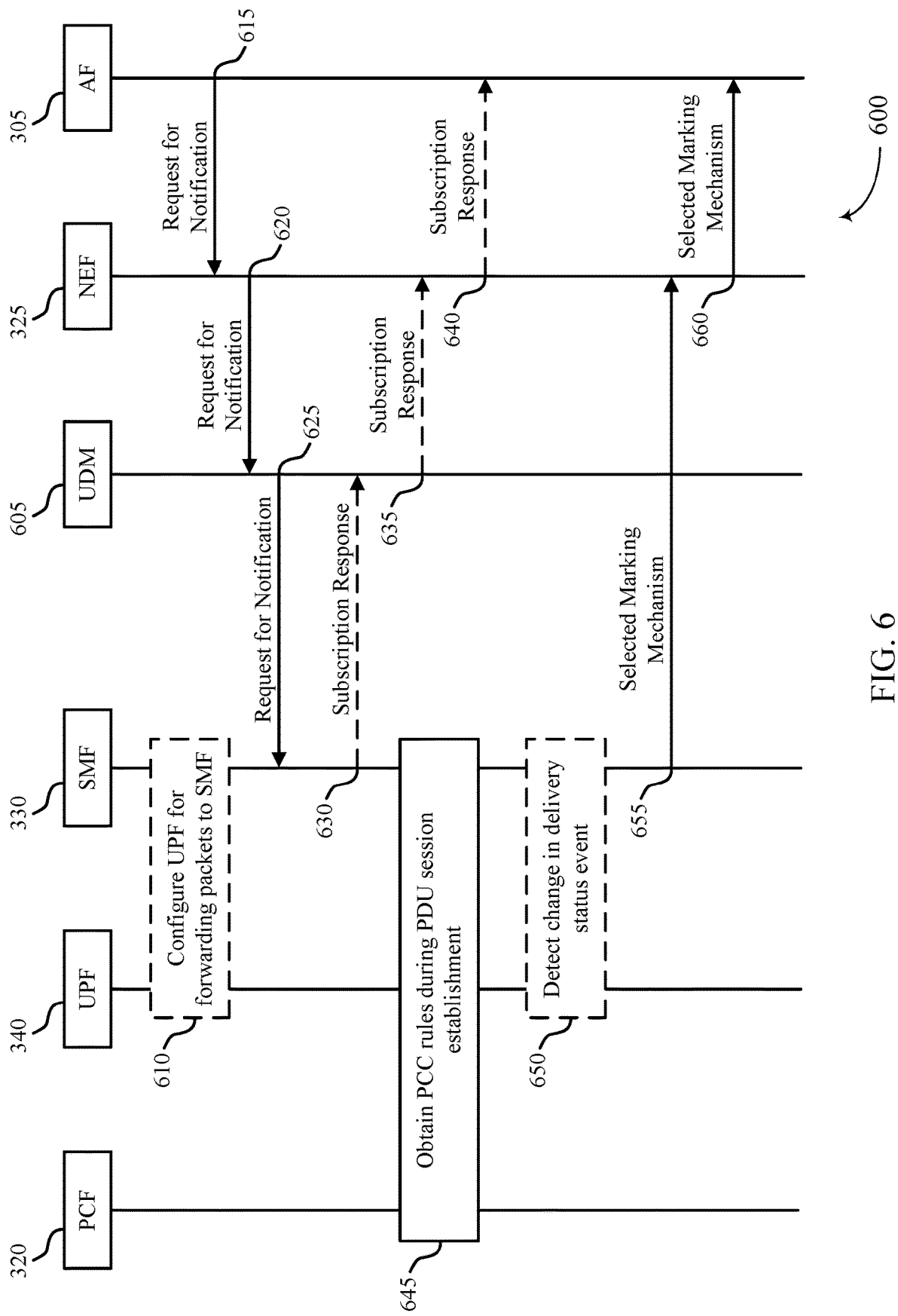

FIG. 6 shows an example of a process flow 600 that supports negotiation and notification of PDU set or data burst marking mechanisms in accordance with one or more aspects of the present disclosure. The process flow 600 may implement aspects of the wireless communications system 100, the network architecture 200, the network diagram 300, the process flow 400, or the process flow 500. For example, the process flow 600 illustrates communication between the AF 305, the NEF 325, a unified data management (UDM) function 605, the SMF 330, the UPF 340, and the PCF 320. In some implementations, one or more of these network entities 105 or functionalities may communicate a notification of a selected marking mechanism that is to be used for identification of packets that belong to a same PDU set or data burst. In some aspects, the process flow 600 may illustrate communication at or during session establishment or modification.

In the following description of the process flow 600, the operations may be performed (such as reported or provided) in a different order than the order shown, or the operations performed by the example devices may be performed in different orders or at different times. Some operations also may be left out of the process flow 600, or other operations may be added to the process flow 600. Further, although some operations or signaling may be shown to occur at different times for discussion purposes, these operations may actually occur at the same time.

At 610, the SMF 330 may select and configure the UPF 340 for forwarding packets (e.g., PDUs) to the SMF 330.

At 615, the AF 305 may output, to the NEF 325, a request for a notification of (e.g., a request for information indicative of) a selected marking mechanism that is to be used for identification of packets that belong to a same PDU set or data burst. In some implementations, the AF 305 may output the request to the NEF 325 via a subscription request message, such as an event exposure subscription request message. For example, the AF 305 may output the request via an Nnef_EventExposure_Subscribe request message. In some implementations, the AF 305 may include an event (e.g., an event identifier, an event filter, or an event field) in the subscription request message that indicates that the request is for one or both of PDU set marking or data burst marking. For example, the AF 305 may set the event equal to or to otherwise indicate 'PDU set marking' or 'burst marking' or 'PDU set and burst marking.'

At 620, the NEF 325 may output (e.g., forward or relay), to the UDM function 605, the request, by the AF 305, for the notification of the selected marking mechanism. In some implementations, the NEF 325 may output, forward, or relay the request via a subscription request message, such as an event exposure subscription request message. For example, the NEF 325 may output the request via an Nudm_EventExposure_Subscribe request message. In some implementations, the NEF 325 may include an event in the subscription request message that indicates that the request is for one or both of PDU set marking or data burst marking. For example, the NEF 325 may set the event equal to or to otherwise indicate 'PDU set marking' or 'burst marking' or 'PDU set and burst marking.'

At 625, the UDM function 605 may output (e.g., transmit, forward, or relay), to the SMF 330, the request, by the AF 305, for the notification of the selected marking mechanism. In some implementations, the UDM function 605 may output, forward, or relay the request via a subscription request message, such as an event exposure subscription request message. For example, the UDM function 605 may output the request via an Nsmf_EventExposure_Subscribe request message. In some implementations, the UDM function 605 may include an event in the subscription request message that indicates that the request is for one or both of PDU set marking or data burst marking. For example, the UDM function 605 may set the event equal to or to otherwise indicate 'PDU set marking' or 'burst marking' or 'PDU set and burst marking.' As such, the AF 305 may effectively output the request for the notification of the selected marking mechanism to the SMF 330 via the NEF 325 and the UDM function 605.

In some implementations, the SMF 330 may monitor for the request in accordance with the event that indicates that the request is for one or both of PDU set marking or data burst marking. For example, the SMF 330 may select a specific monitoring occasion or a specific monitoring identifier, or both, to enable the SMF 330 to obtain the request for the notification of the selected marking mechanism. In other words, the SMF 330 (and/or the UPF 340) may support a monitoring event that is specifically associated with the request for the notification of the selected marking mechanism. In some aspects, the SMF 330 and the UPF 340 may support logic (e.g., a decision to obtain or not obtain a given message or whether to make specific a decision or activate a specific signaling mechanism) based on the monitoring event associated with the request for the notification of the selected marking mechanism.

At 630, the SMF 330 may output, to the UDM function 605, a subscription response message. In some aspects, the subscription response message may be an example of an Nsmf_EventExposure_Subscribe response message.

At 635, the UDM function 605 may output, to the NEF 325, a subscription response message. In some aspects, the subscription response message may be an example of an Nudm_EventExposure_Subscribe response message.

At 640, the NEF 325 may output, to the AF 305, a subscription response message. In some aspects, the subscription response message may be an example of an Nnef_EventExposure_Subscribe response message. As such, the SMF 330 may effectively confirm or acknowledge the subscription by the AF 305 for the notification of the selected marking mechanism. In other words, the AF 305 may use Nnef/udm/smf_EventExposure_Subscribe messages to request to be notified of a selected option for marking one or both of PDU sets or data bursts.

At 645, the SMF 330 may retrieve or otherwise obtain a set of one or more policy control rules (e.g., PCC rules). In some implementations, the SMF 330 may dynamically retrieve the policy control rules from the PCF 320 during a PDU session establishment or modification. In such implementations, the policy control rules stored or maintained at the PCF 320 may include details or information associated with one or more marking mechanism options (for either or both of PDU set marking or data burst marking) that are preferred by the AF 305. Accordingly, in such implementations, the SMF 330 may output a request to the PCF 320 for the policy control rules and the PCF 320 may output an indication of (e.g., information indicative of) the policy control rules to the SMF 330. In some aspects, the PCF 320 may provide the policy control rules to the SMF 330 without a request by the SMF 330.

In some other implementations, the SMF 330 may obtain the policy control rules without interacting with the PCF 320. In such implementations, the SMF 330 may use one or more policy control rules that are pre-defined or pre-configured at the SMF 330. Further, in such implementations, the SMF 330 may expect that the one or more policy control rules that are pre-defined or pre-configured at the SMF 330 include details or information associated with one or more marking mechanism options (for either or both of PDU set marking or data burst marking) that are preferred by the AF 305. For example, at least one of the policy control rules that are pre-defined or pre-configured at the SMF 330 may include or be based on one or more marking mechanism options that are preferred by the AF 305.

In some aspects, the one or more policy control rules that the SMF 330 retrieves or obtains may indicate a specific marking mechanism that is to be used for identification of packets that belong to a same PDU set or data burst. As such, the SMF 330 may select the indicated marking mechanism, which may be referred to herein as the selected marking mechanism. In some implementations, the SMF 330 may further select the UPF 340 (from a set of potentially multiple UPFs) based on the selected marking mechanism and may configure the UPF 340 based on the selected marking mechanism. For example, a configuration of the UPF 340 may be associated with an establishment of a traffic flow to be communicated in accordance with the selected marking mechanism. As such, a UPF selection logic may be based on PDU set or burst marking options that are preferred or supported by one or both of the SMF 330 and the AF 305.

As part of the selection and configuration of the UPF 340 by the SMF 330, the SMF 330 may select the UPF 340 based on the marking mechanism indicated in the one or more policy control rules and in accordance with information associated with a capability of the UPF 340 for the selected marking mechanism. As such, in some implementations, the UPF 340 may perform network function (NF) registration with a network repository function (NRF) by indicating a capability of the UPF 340 for PDU set or burst marking. The SMF 330 may accordingly perform NF discovery with the NRF by searching or querying the selected marking mechanism to determine or identify which one or more UPFs are capable of using the selected marking mechanism. In accordance with the search or query of the NRF by the SMF 330 for the selected marking mechanism, the SMF 330 may identify that the UPF 340 is capable of the selected marking mechanism.

At 650, the SMF 330 and the UPF 340 may detect a change in a delivery status event.

At 655, the SMF 330 may output, to the NEF 325, an indication of the selected marking mechanism. In some implementations, the SMF 330 may output the indication of the selected marking mechanism to the NEF 325 via a notification message, such as an event exposure notification message. For example, the SMF 330 may output the indication via an Nsmf_EventExposure_Notify message.

At 660, the NEF 325 may output, to the AF 305, an indication of the selected marking mechanism. In some implementations, the NEF 325 may output the indication of the selected marking mechanism to the AF 305 via a notification message, such as an event exposure notification message. For example, the NEF 325 may output the indication via an Nnef_EventExposure_Notify message.

As such, the SMF 330 may effectively re-use event exposure signaling via the NEF 325 to notify the AF 305 of the selected marking mechanism (e.g., the selected method for marking) by using Nsmf/nef_EventExposure_Notify messages. In some implementations, the SMF 330 may indicate the AF 305 of the selected marking mechanism based on the actual capabilities of the UPF 340. For example, in accordance with selecting the UPF 340 based on a selected marking mechanism, the SMF 330 may, in some implementations, update or adjust the selected marking mechanism to satisfy the actual capabilities of the UPF 340. In such implementations, the SMF 330 may indicate the updated or adjusted selected marking mechanism to the AF 305.

Figure 7:
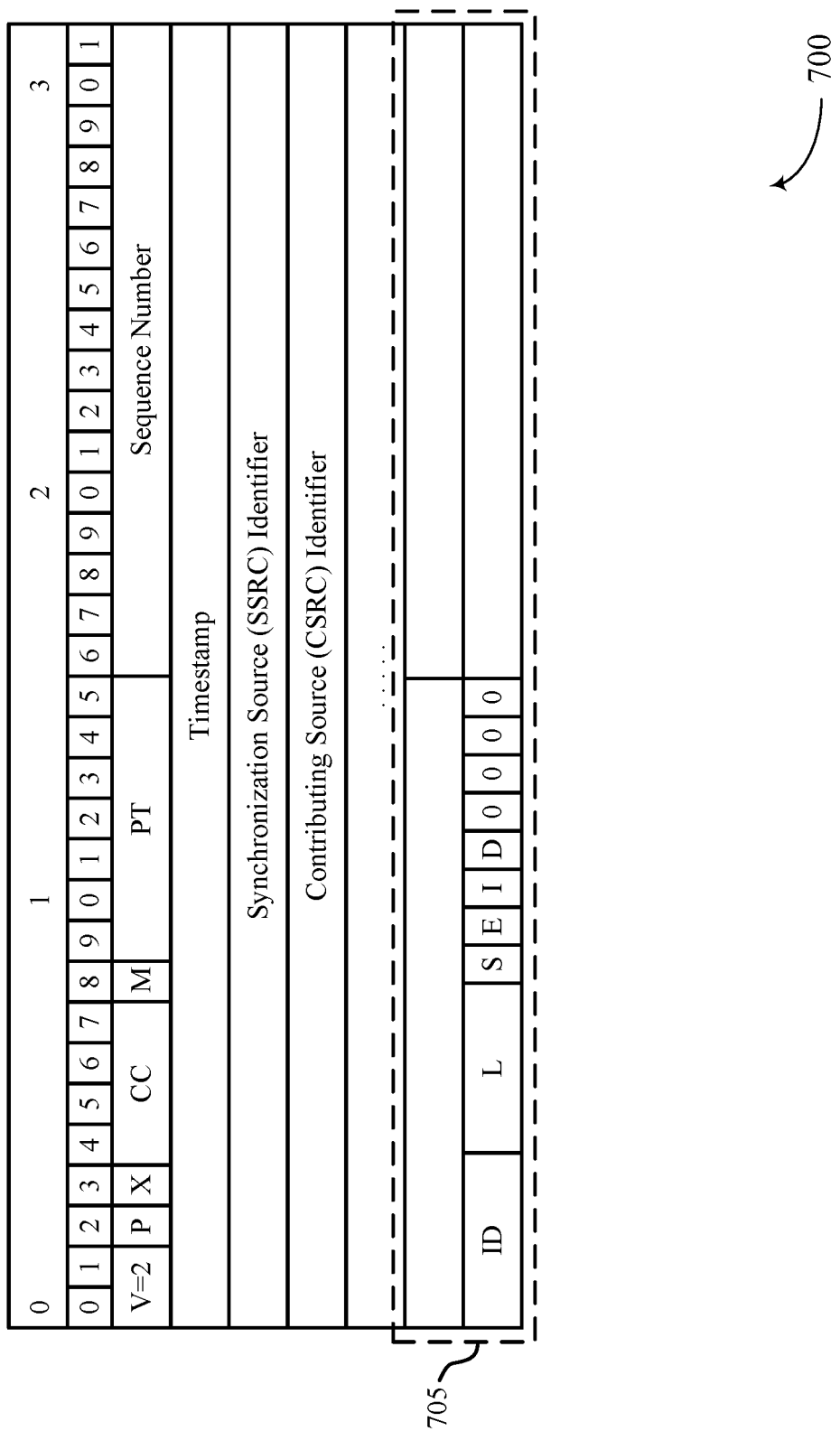
FIG. 7 shows an example of a header format that supports negotiation and notification of PDU set or data burst marking mechanisms in accordance with one or more aspects of the present disclosure.

FIG. 7 shows an example of a header format 700 that supports negotiation and notification of PDU set or data burst marking mechanisms in accordance with one or more aspects of the present disclosure. The header format 700 may implement or be implemented to realize aspects of the wireless communications system 100, the network architecture 200, the network diagram 300, the process flow 400, the process flow 500, or the process flow 600. In some scenarios, the AS 310 and the UPF 340 may use the header format 700 to mark packets as belonging to a PDU set in accordance with an RTP marking mechanism. As illustrated by FIG. 7, an example header excluding the fields 705 may be an example of an RTP header format and an example header including the fields 705 may be an example of an RTP header extension format.

In RTP headers, a marker "M" bit is set for a last packet of a frame indicated by the RTP timestamp. Therefore, the UPF 340 may be based on the "M" bit to identify the start and end of a PDU set or frame (where a PDU set may be equivalently referred to as a PDU frame). In accordance with an option associated with identification based on the RTP header extension, an "S" bit and an "E" bit in the frame marking RTP header extension respectively represent the start and the end of a frame (e.g., a video frame). As such, the UPF 340 may identify the start and end of a PDU set or frame according to the "S" and "E" bits. In some aspects, the identification of a video frame based on the "S" and "E" bits in the RTP header extension may also apply for scalable video streams.

Alternatively, the UPF 340 may use periodicity information as frame traffic pattern to identify a PDU set or frame. The traffic pattern may also be detected by the UPF 340. For example, downlink media traffic may be 60 PDU sets per second (e.g., 60 frames per second (FPS)) and the UPF 340 may determine that it receives a PDU set (e.g., a complete PDU set) every 16.67 milliseconds.

Figure 8:
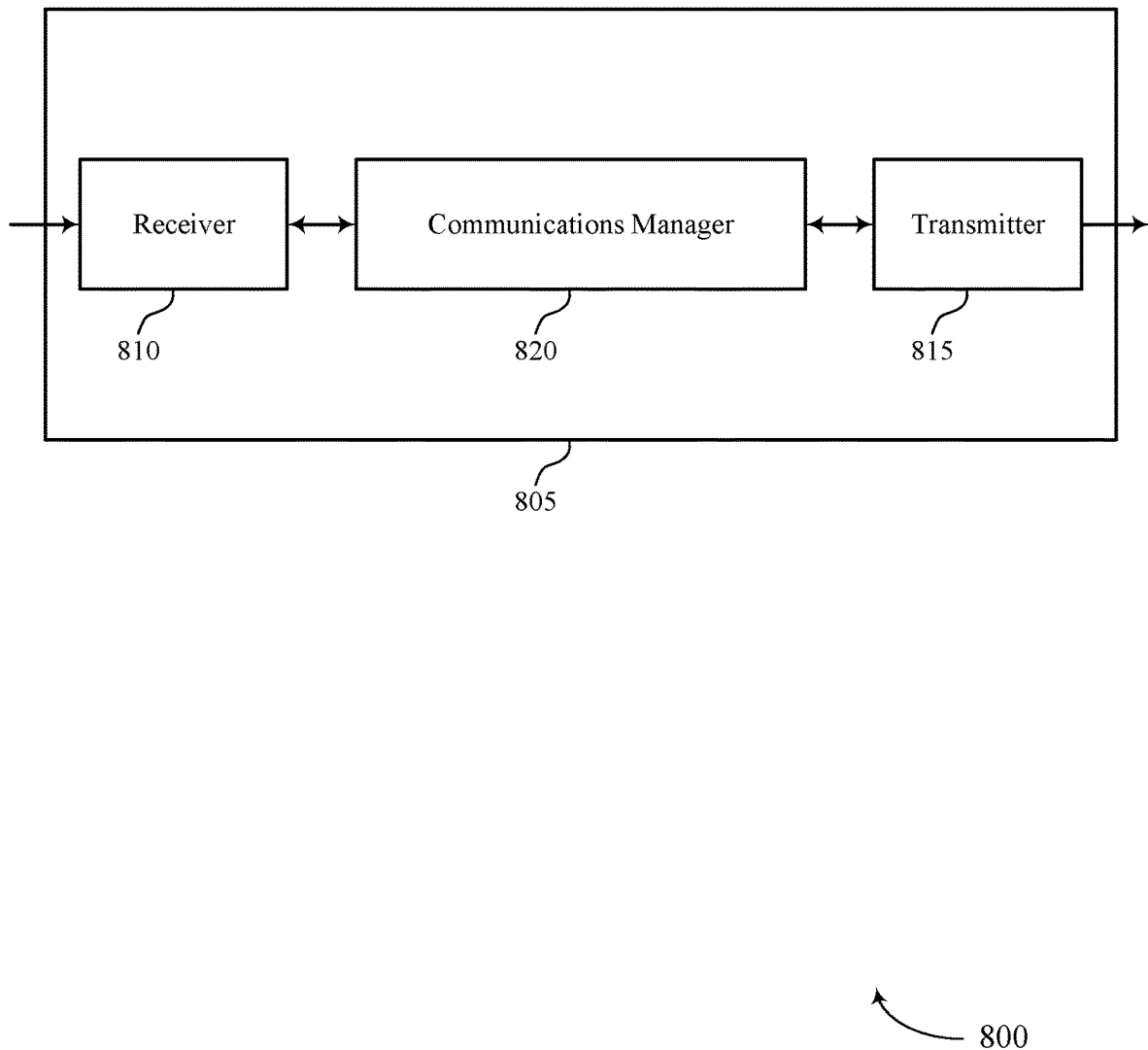
FIGS. 8 and 9 show block diagrams of devices that support negotiation and notification of PDU set or data burst marking mechanisms in accordance with one or more aspects of the present disclosure.

FIG. 8 shows a block diagram 800 of a device 805 that supports negotiation and notification of PDU set or data burst marking mechanisms in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of negotiation and notification of PDU set or data burst marking mechanisms as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for outputting, to a core network entity, a request for transmission of information indicative of a set of available marking mechanisms for identification of packets that belong to a same PDU set or a same data burst. The communications manager 820 may be configured as or otherwise support a means for obtaining, from the core network entity and responsive to the request, the information indicative of the set of available marking mechanisms. The communications manager 820 may be configured as or otherwise support a means for outputting, to the core network entity, an indication of a subset of one or more marking mechanisms from the set of available marking mechanisms, where at least one marking mechanism of the subset of one or more marking mechanisms corresponds to a policy control rule update for the core network entity.

Additionally, or alternatively, the communications manager 820 may support wireless communication at a network entity in accordance with examples as disclosed herein. For example, the communications manager 820 may be configured as or otherwise support a means for obtaining, from a core network entity, information indicative of a set of available marking mechanisms for identification of packets that belong to a same PDU set or a same data burst, and outputting, to the core network entity, an indication of at least one marking mechanism from the set of available marking mechanisms that corresponds to a policy control rule update for the core network entity.

Additionally, or alternatively, the communications manager 820 may support wireless communication at a first network entity in accordance with examples as disclosed herein. For example, the communications manager 820 may be configured as or otherwise support a means for obtaining, from a second network entity, a request for transmission of information indicative of a set of available marking mechanisms for identification of packets that belong to a same PDU set or a same data burst. The communications manager 820 may be configured as or otherwise support a means for obtaining, in accordance with a network configuration, the information indicative of the set of available marking mechanisms. The communications manager 820 may be configured as or otherwise support a means for outputting, to the second network entity and responsive to the request, the information indicative of the set of available marking mechanisms.

Additionally, or alternatively, the communications manager 820 may support wireless communication at a first network entity in accordance with examples as disclosed herein. For example, the communications manager 820 may be configured as or otherwise support a means for outputting, to a second network entity, information indicative of a set of available marking mechanisms for identification of packets that belong to a same PDU set or a same data burst, and obtaining, from the second network entity, an indication of at least one marking mechanism from the set of available marking mechanisms.

Additionally, or alternatively, the communications manager 820 may support wireless communication at a first network entity in accordance with examples as disclosed herein. For example, the communications manager 820 may be configured as or otherwise support a means for obtaining, from second network entity, information indicative of a subset of one or more marking mechanisms from a set of available marking mechanisms, where the set of available marking mechanisms enables identification of packets that belong to a same PDU set or a same data burst. The communications manager 820 may be configured as or otherwise support a means for updating a policy control rule associated with one or both of PDU set marking or data burst marking in accordance with at least one marking mechanism of the subset of one or more marking mechanisms.

Additionally, or alternatively, the communications manager 820 may support wireless communication at a first network entity in accordance with examples as disclosed herein. For example, the communications manager 820 may be configured as or otherwise support a means for obtaining, from second network entity, information indicative of at least one marking mechanism from a set of available marking mechanisms, where the set of available marking mechanisms enables identification of packets that belong to a same PDU set or a same data burst, and updating a policy control rule associated with one or both of PDU set marking or data burst marking in accordance with the at least one marking mechanism.

Additionally, or alternatively, the communications manager 820 may support wireless communication at a first network entity in accordance with examples as disclosed herein. For example, the communications manager 820 may be configured as or otherwise support a means for outputting, to a core network entity, a request for transmission of information indicative of a marking mechanism, where the marking mechanism enables identification of packets that belong to a same PDU set or a same data burst. The communications manager 820 may be configured as or otherwise support a means for obtaining, from the core network entity and in accordance with the request, the information indicative of the marking mechanism. The communications manager 820 may be configured as or otherwise support a means for outputting, to a second network entity, an indication of the marking mechanism, where the indication of the marking mechanism to the second network entity is associated with an establishment of a traffic flow in accordance with the marking mechanism.

Additionally, or alternatively, the communications manager 820 may support wireless communication at a first network entity in accordance with examples as disclosed herein. For example, the communications manager 820 may be configured as or otherwise support a means for obtaining, from a second network entity, a request for transmission of information indicative of a marking mechanism, where the marking mechanism enables identification of packets that belong to a same PDU set or a same data burst. The communications manager 820 may be configured as or otherwise support a means for obtaining, in accordance with one or more policy control rules, the information indicative of the marking mechanism. The communications manager 820 may be configured as or otherwise support a means for outputting, to the second network entity and in accordance with the request, the information indicative of the marking mechanism, where the information indicative of the marking mechanism is associated with an establishment of a traffic flow in accordance with the marking mechanism.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources.

Figure 9:
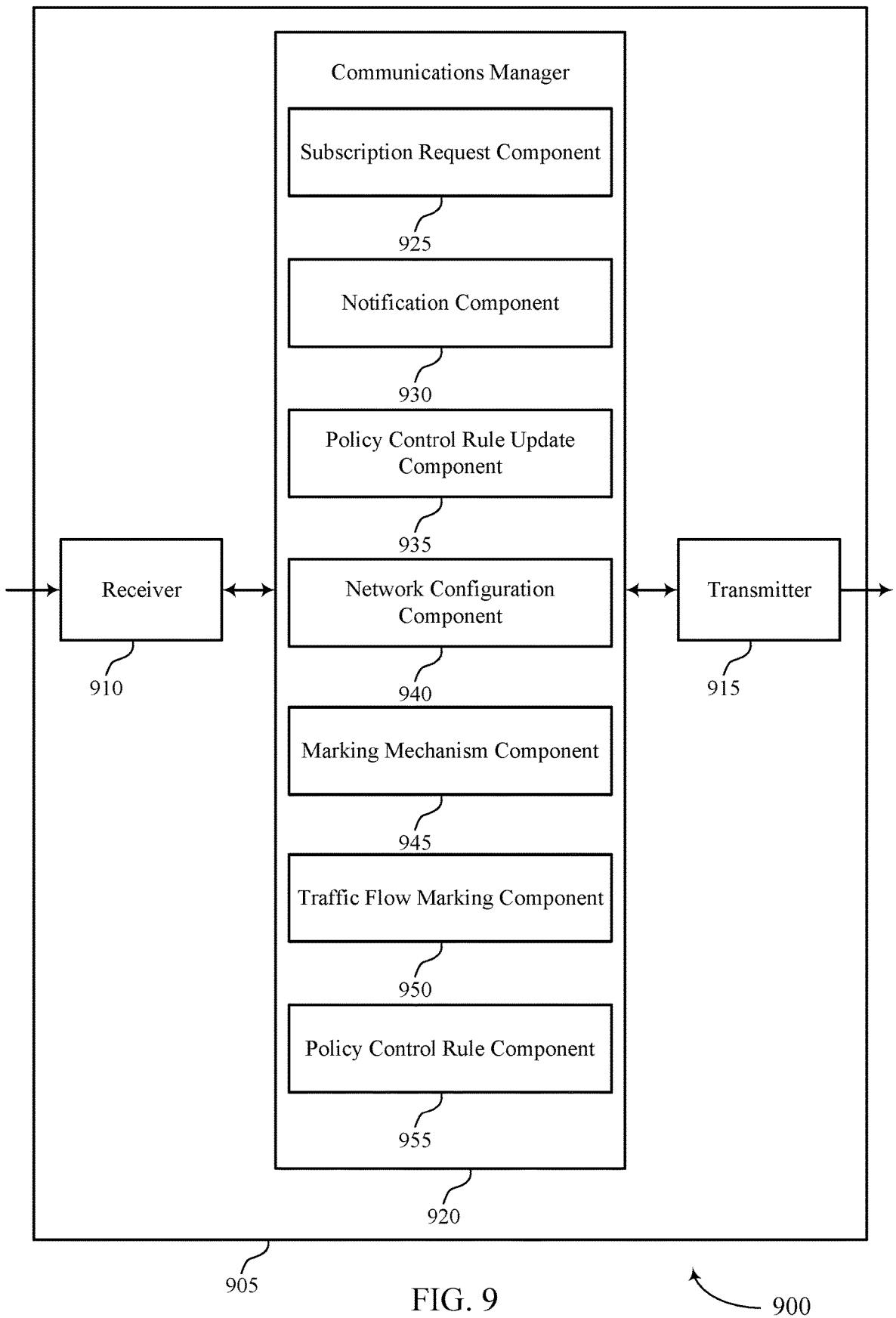

FIG. 9 shows a block diagram 900 of a device 905 that supports negotiation and notification of PDU set or data burst marking mechanisms in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of negotiation and notification of PDU set or data burst marking mechanisms as described herein. For example, the communications manager 920 may include a subscription request component 925, a notification component 930, a policy control rule update component 935, a network configuration component 940, a marking mechanism component 945, a traffic flow marking component 950, a policy control rule component 955, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The subscription request component 925 may be configured as or otherwise support a means for outputting, to a core network entity, a request for transmission of information indicative of a set of available marking mechanisms for identification of packets that belong to a same PDU set or a same data burst. The notification component 930 may be configured as or otherwise support a means for obtaining, from the core network entity and responsive to the request, the information indicative of the set of available marking mechanisms. The policy control rule update component 935 may be configured as or otherwise support a means for outputting, to the core network entity, an indication of a subset of one or more marking mechanisms from the set of available marking mechanisms, where at least one marking mechanism of the subset of one or more marking mechanisms corresponds to a policy control rule update for the core network entity.

Additionally, or alternatively, the communications manager 920 may support wireless communication at a network entity in accordance with examples as disclosed herein. The notification component 930 may be configured as or otherwise support a means for obtaining, from a core network entity, information indicative of a set of available marking mechanisms for identification of packets that belong to a same PDU set or a same data burst. The policy control rule update component 935 may be configured as or otherwise support a means for outputting, to the core network entity, an indication of at least one marking mechanism from the set of available marking mechanisms that corresponds to a policy control rule update for the core network entity.

Additionally, or alternatively, the communications manager 920 may support wireless communication at a first network entity in accordance with examples as disclosed herein. The subscription request component 925 may be configured as or otherwise support a means for obtaining, from a second network entity, a request for transmission of information indicative of a set of available marking mechanisms for identification of packets that belong to a same PDU set or a same data burst. The network configuration component 940 may be configured as or otherwise support a means for obtaining, in accordance with a network configuration, the information indicative of the set of available marking mechanisms. The notification component 930 may be configured as or otherwise support a means for outputting, to the second network entity and responsive to the request, the information indicative of the set of available marking mechanisms.

Additionally, or alternatively, the communications manager 920 may support wireless communication at a first network entity in accordance with examples as disclosed herein. The notification component 930 may be configured as or otherwise support a means for outputting, to a second network entity, information indicative of a set of available marking mechanisms for identification of packets that belong to a same PDU set or a same data burst. The policy control rule update component 935 may be configured as or otherwise support a means for obtaining, from the second network entity, an indication of at least one marking mechanism from the set of available marking mechanisms.

Additionally, or alternatively, the communications manager 920 may support wireless communication at a first network entity in accordance with examples as disclosed herein. The marking mechanism component 945 may be configured as or otherwise support a means for obtaining, from a second network entity, information indicative of a subset of one or more marking mechanisms from a set of available marking mechanisms, where the set of available marking mechanisms enables identification of packets that belong to a same PDU set or a same data burst. The policy control rule update component 935 may be configured as or otherwise support a means for updating a policy control rule associated with one or both of PDU set marking or data burst marking in accordance with at least one marking mechanism of the subset of one or more marking mechanisms.

Additionally, or alternatively, the communications manager 920 may support wireless communication at a first network entity in accordance with examples as disclosed herein. The marking mechanism component 945 may be configured as or otherwise support a means for obtaining, from second network entity, information indicative of at least one marking mechanism from a set of available marking mechanisms, where the set of available marking mechanisms enables identification of packets that belong to a same PDU set or a same data burst. The policy control rule update component 935 may be configured as or otherwise support a means for updating a policy control rule associated with one or both of PDU set marking or data burst marking in accordance with the at least one marking mechanism.

Additionally, or alternatively, the communications manager 920 may support wireless communication at a first network entity in accordance with examples as disclosed herein. The subscription request component 925 may be configured as or otherwise support a means for outputting, to a core network entity, a request for transmission of information indicative of a marking mechanism, where the marking mechanism enables identification of packets that belong to a same PDU set or a same data burst. The notification component 930 may be configured as or otherwise support a means for obtaining, from the core network entity and in accordance with the request, the information indicative of the marking mechanism. The traffic flow marking component 950 may be configured as or otherwise support a means for outputting, to a second network entity, an indication of the marking mechanism, where the indication of the marking mechanism to the second network entity is associated with an establishment of a traffic flow in accordance with the marking mechanism.

Additionally, or alternatively, the communications manager 920 may support wireless communication at a first network entity in accordance with examples as disclosed herein. The subscription request component 925 may be configured as or otherwise support a means for obtaining, from a second network entity, a request for transmission of information indicative of a marking mechanism, where the marking mechanism enables identification of packets that belong to a same PDU set or a same data burst. The policy control rule component 955 may be configured as or otherwise support a means for obtaining, in accordance with one or more policy control rules, the information indicative of the marking mechanism. The notification component 930 may be configured as or otherwise support a means for outputting, to the second network entity and in accordance with the request, the information indicative of the marking mechanism, where the information indicative of the marking mechanism is associated with an establishment of a traffic flow in accordance with the marking mechanism.

Figure 10:
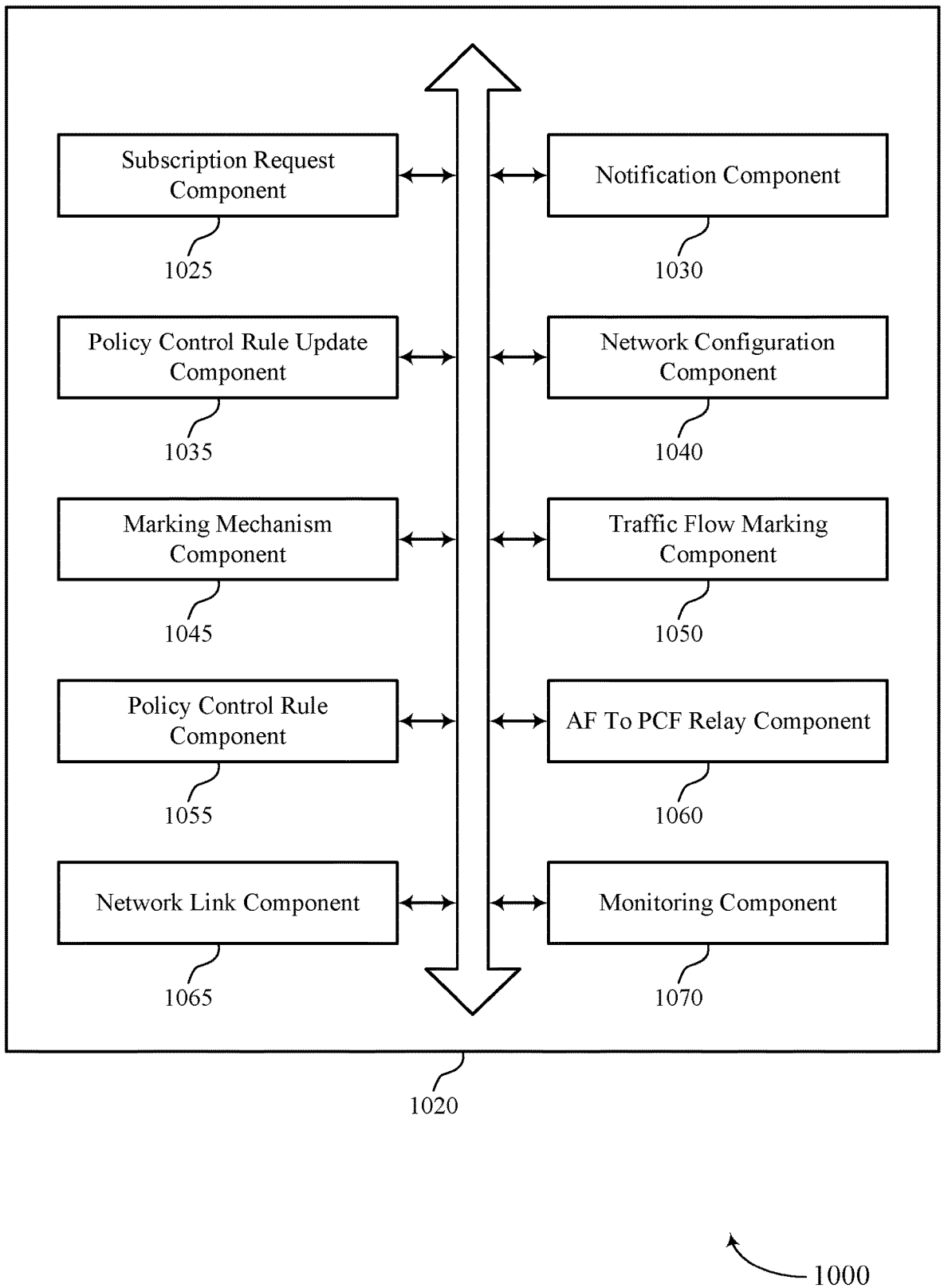
FIG. 10 shows a block diagram of a communications manager that supports negotiation and notification of PDU set or data burst marking mechanisms in accordance with one or more aspects of the present disclosure.

FIG. 10 shows a block diagram 1000 of a communications manager 1020 that supports negotiation and notification of PDU set or data burst marking mechanisms in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of negotiation and notification of PDU set or data burst marking mechanisms as described herein. For example, the communications manager 1020 may include a subscription request component 1025, a notification component 1030, a policy control rule update component 1035, a network configuration component 1040, a marking mechanism component 1045, a traffic flow marking component 1050, a policy control rule component 1055, an AF to PCF relay component 1060, a network link component 1065, a monitoring component 1070, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The subscription request component 1025 may be configured as or otherwise support a means for outputting, to a core network entity, a request for transmission of information indicative of a set of available marking mechanisms for identification of packets that belong to a same PDU set or a same data burst. The notification component 1030 may be configured as or otherwise support a means for obtaining, from the core network entity and responsive to the request, the information indicative of the set of available marking mechanisms. The policy control rule update component 1035 may be configured as or otherwise support a means for outputting, to the core network entity, an indication of a subset of one or more marking mechanisms from the set of available marking mechanisms, where at least one marking mechanism of the subset of one or more marking mechanisms corresponds to a policy control rule update for the core network entity.

In some examples, to support outputting the request, the subscription request component 1025 may be configured as or otherwise support a means for outputting the request to a network exposure function via a subscription request message, where the core network entity includes the network exposure function.

In some examples, the subscription request message includes an event that indicates that the request corresponds to one or both of PDU set marking or data burst marking.

In some examples, the subscription request message is an event exposure subscription request message.

In some examples, to support obtaining the information, the notification component 1030 may be configured as or otherwise support a means for obtaining the information from a network exposure function via an event exposure notification message, where the core network entity includes the network exposure function.

In some examples, the core network entity includes an NEF, and the information indicative of the set of available marking mechanisms is associated with the NEF.

In some examples, to support obtaining the information, the notification component 1030 may be configured as or otherwise support a means for obtaining capability information associated with the core network entity, where the capability information is indicative of the set of available marking mechanisms, and where an obtainment of the information is associated with an exposure of the set of available marking mechanisms to the network entity.

In some examples, to support outputting the indication, the policy control rule update component 1035 may be configured as or otherwise support a means for outputting the indication to a policy control function, where the core network entity includes the policy control function.

In some examples, the core network entity may include a PCF, and the policy control rule update for the core network entity may be associated with the PCF.

In some examples, each respective marking mechanism of the subset of one or more marking mechanisms is compatible with the network entity.

In some examples, to support outputting the indication, the network link component 1065 may be configured as or otherwise support a means for outputting the indication to the policy control function via a network exposure function.

In some examples, the set of available marking mechanisms is associated with a network configuration.

In some examples, the set of available marking mechanisms is stored in one or more of a memory accessible by a network exposure function; a unified data repository; or an operations, administration, and maintenance entity in accordance with the network configuration.

In some examples, to support obtaining the information, the network configuration component 1040 may be configured as or otherwise support a means for obtaining the information from one or more of a memory accessible by a network exposure function; a unified data repository; or an operations, administration, and maintenance entity in accordance with the network configuration.

In some examples, the network entity is an application function and the core network entity includes one or both of a network exposure function or a policy control function.

Additionally, or alternatively, the communications manager 1020 may support wireless communication at a first network entity in accordance with examples as disclosed herein. In some examples, the subscription request component 1025 may be configured as or otherwise support a means for obtaining, from a second network entity, a request for transmission of information indicative of a set of available marking mechanisms for identification of packets that belong to a same PDU set or a same data burst. The network configuration component 1040 may be configured as or otherwise support a means for obtaining, in accordance with a network configuration, the information indicative of the set of available marking mechanisms. In some examples, the notification component 1030 may be configured as or otherwise support a means for outputting, to the second network entity and responsive to the request, the information indicative of the set of available marking mechanisms.

In some examples, to support obtaining the request, the subscription request component 1025 may be configured as or otherwise support a means for obtaining the request from an application function via a subscription request message, where the second network entity is the application function.

In some examples, the subscription request message includes an event that indicates that the request corresponds to one or both of PDU set marking or data burst marking.

In some examples, the subscription request message is an event exposure subscription request message.

In some examples, to support outputting the information, the notification component 1030 may be configured as or otherwise support a means for outputting the information to an application function via an event exposure notification message, where the second network entity is the application function.

In some examples, the AF to PCF relay component 1060 may be configured as or otherwise support a means for obtaining, from the second network entity, information indicative of a subset of one or more marking mechanisms from the set of available marking mechanisms. In some examples, the AF to PCF relay component 1060 may be configured as or otherwise support a means for outputting, to a policy control function, an indication of the subset of one or more marking mechanisms, where at least one marking mechanism of the subset of one or more marking mechanisms corresponds to a policy control rule update for the policy control function.

In some examples, each respective marking mechanism of the subset of one or more marking mechanisms is compatible with the second network entity.

In some examples, the set of available marking mechanisms is stored in one or more of a memory accessible by a network exposure function; a unified data repository; or an operations, administration, and maintenance entity in accordance with the network configuration.

In some examples, to support obtaining the information, the network configuration component 1040 may be configured as or otherwise support a means for obtaining the information from one or more of a memory accessible by a network exposure function; a unified data repository; or an operations, administration, and maintenance entity in accordance with the network configuration.

In some examples, the first network entity is a network exposure function and the second network entity is an application function.

Additionally, or alternatively, the communications manager 1020 may support wireless communication at a first network entity in accordance with examples as disclosed herein. The marking mechanism component 1045 may be configured as or otherwise support a means for obtaining, from second network entity, information indicative of a subset of one or more marking mechanisms from a set of available marking mechanisms, where the set of available marking mechanisms enables identification of packets that belong to a same PDU set or a same data burst. In some examples, the policy control rule update component 1035 may be configured as or otherwise support a means for updating a policy control rule associated with one or both of PDU set marking or data burst marking in accordance with at least one marking mechanism of the subset of one or more marking mechanisms.

In some examples, to support updating the policy control rule, the policy control rule update component 1035 may be configured as or otherwise support a means for permitting the first network entity to modify marking options for one or both of the PDU set marking or the data burst marking for a dynamic policy control rule used by a session management function.

In some examples, to support obtaining the information, the AF to PCF relay component 1060 may be configured as or otherwise support a means for obtaining the information from an application function via a network exposure function, where the second network entity is the application function.

In some examples, each respective marking mechanism of the subset of one or more marking mechanisms is compatible with the application function.

In some examples, the set of available marking mechanisms is associated with a network configuration.

In some examples, the set of available marking mechanisms is stored in one or more of a memory accessible by a network exposure function; a unified data repository; or an operations, administration, and maintenance entity in accordance with the network configuration.

In some examples, the network configuration component 1040 may be configured as or otherwise support a means for obtaining the information from one or more of a memory accessible by a network exposure function; a unified data repository; or an operations, administration, and maintenance entity in accordance with the network configuration.

In some examples, the first network entity is a policy control function and the second network entity is an application function.

Additionally, or alternatively, the communications manager 1020 may support wireless communication at a first network entity in accordance with examples as disclosed herein. In some examples, the subscription request component 1025 may be configured as or otherwise support a means for outputting, to a core network entity, a request for transmission of information indicative of a marking mechanism, where the marking mechanism enables identification of packets that belong to a same PDU set or a same data burst. In some examples, the notification component 1030 may be configured as or otherwise support a means for obtaining, from the core network entity and in accordance with the request, the information indicative of the marking mechanism. The traffic flow marking component 1050 may be configured as or otherwise support a means for outputting, to a second network entity, an indication of the marking mechanism, where the indication of the marking mechanism to the second network entity is associated with an establishment of a traffic flow in accordance with the marking mechanism.

In some examples, to support outputting the request, the subscription request component 1025 may be configured as or otherwise support a means for outputting the request to a session management function via a subscription request message, where the core network entity includes the session management function.

In some examples, the subscription request message includes an event that indicates that the request corresponds to one or both of PDU set marking or data burst marking.

In some examples, to support outputting the request, the subscription request component 1025 may be configured as or otherwise support a means for outputting the request to the session management function via a network exposure function and a unified data management function, where the core network entity further includes the network exposure function and the unified data management function.

In some examples, the subscription request message is an event exposure subscription request message.

In some examples, the marking mechanism is associated with a dynamic retrieval of one or more policy control rules from a policy control function during a PDU session establishment or modification. In some examples, the one or more policy control rules are based on one or more marking mechanisms that are compatible with the first network entity.

In some examples, the marking mechanism is associated with one or more policy control rules that are predefined for the core network entity. In some examples, the one or more policy control rules are based on of one or more marking mechanisms that are compatible with the first network entity.

In some examples, to support obtaining the information, the notification component 1030 may be configured as or otherwise support a means for obtaining the information from a session management function via an event exposure notification message, where the core network entity includes the session management function.

In some examples, the marking mechanism enables identification of PDU sets or data bursts sent by an application server to a user plane function.

In some examples, the first network entity is an application function, the core network entity is a session management function. In some examples, the second network entity is an application server.

Additionally, or alternatively, the communications manager 1020 may support wireless communication at a first network entity in accordance with examples as disclosed herein. In some examples, the subscription request component 1025 may be configured as or otherwise support a means for obtaining, from a second network entity, a request for transmission of information indicative of a marking mechanism, where the marking mechanism enables identification of packets that belong to a same PDU set or a same data burst. The policy control rule component 1055 may be configured as or otherwise support a means for obtaining, in accordance with one or more policy control rules, the information indicative of the marking mechanism. In some examples, the notification component 1030 may be configured as or otherwise support a means for outputting, to the second network entity and in accordance with the request, the information indicative of the marking mechanism, where the information indicative of the marking mechanism is associated with an establishment of a traffic flow in accordance with the marking mechanism.

In some examples, to support obtaining the request, the subscription request component 1025 may be configured as or otherwise support a means for obtaining the request from an application function via a subscription request message, where the second network entity is the application function.

In some examples, the subscription request message includes an event that indicates that the request corresponds to one or both of PDU set marking or data burst marking.

In some examples, the monitoring component 1070 may be configured as or otherwise support a means for monitoring for the subscription request message based on the event.

In some examples, to support obtaining the request, the subscription request component 1025 may be configured as or otherwise support a means for obtaining the request from the application function via a network exposure function and a unified data management function.

In some examples, the subscription request message is an event exposure subscription request message.

In some examples, the policy control rule component 1055 may be configured as or otherwise support a means for obtaining, dynamically, the one or more policy control rules from a policy control function during a PDU session establishment or modification, where the one or more policy control rules are based on one or more marking mechanisms that are compatible with the first network entity.

In some examples, the one or more policy control rules are predefined at the first network entity. In some examples, the one or more policy control rules are based on one or more marking mechanisms that are compatible with the first network entity.

In some examples, the network configuration component 1040 may be configured as or otherwise support a means for select a user plane function based on the marking mechanism. In some examples, the network configuration component 1040 may be configured as or otherwise support a means for configuring the user plane function based on the marking mechanism, where a configuration of the user plane function based on the marking mechanism is associated with the establishment of the traffic flow in accordance with the marking mechanism.

In some examples, the network configuration component 1040 may be configured as or otherwise support a means for obtaining, from the user plane function, information indicative of a capability of the user plane function that is associated with the marking mechanism, where the user plane function is selected based on the capability of the user plane function.

In some examples, the network configuration component 1040 may be configured as or otherwise support a means for searching a set of marking mechanism options based on one or more marking mechanisms that are compatible with the second network entity. In some examples, the network configuration component 1040 may be configured as or otherwise support a means for identifying the user plane function based on the searching of the set of marking mechanism options, where the user plane function is identified based on being capable of at least one of the one or more marking mechanisms that are compatible with the second network entity.

In some examples, to support outputting the information, the notification component 1030 may be configured as or otherwise support a means for outputting the information to an application function via an event exposure notification message, where the second network entity is the application function.

In some examples, the marking mechanism enables identification of PDU sets or data bursts sent by an application server to a user plane function.

In some examples, the first network entity is a session management function and the second network entity is an application function.

Figure 11:
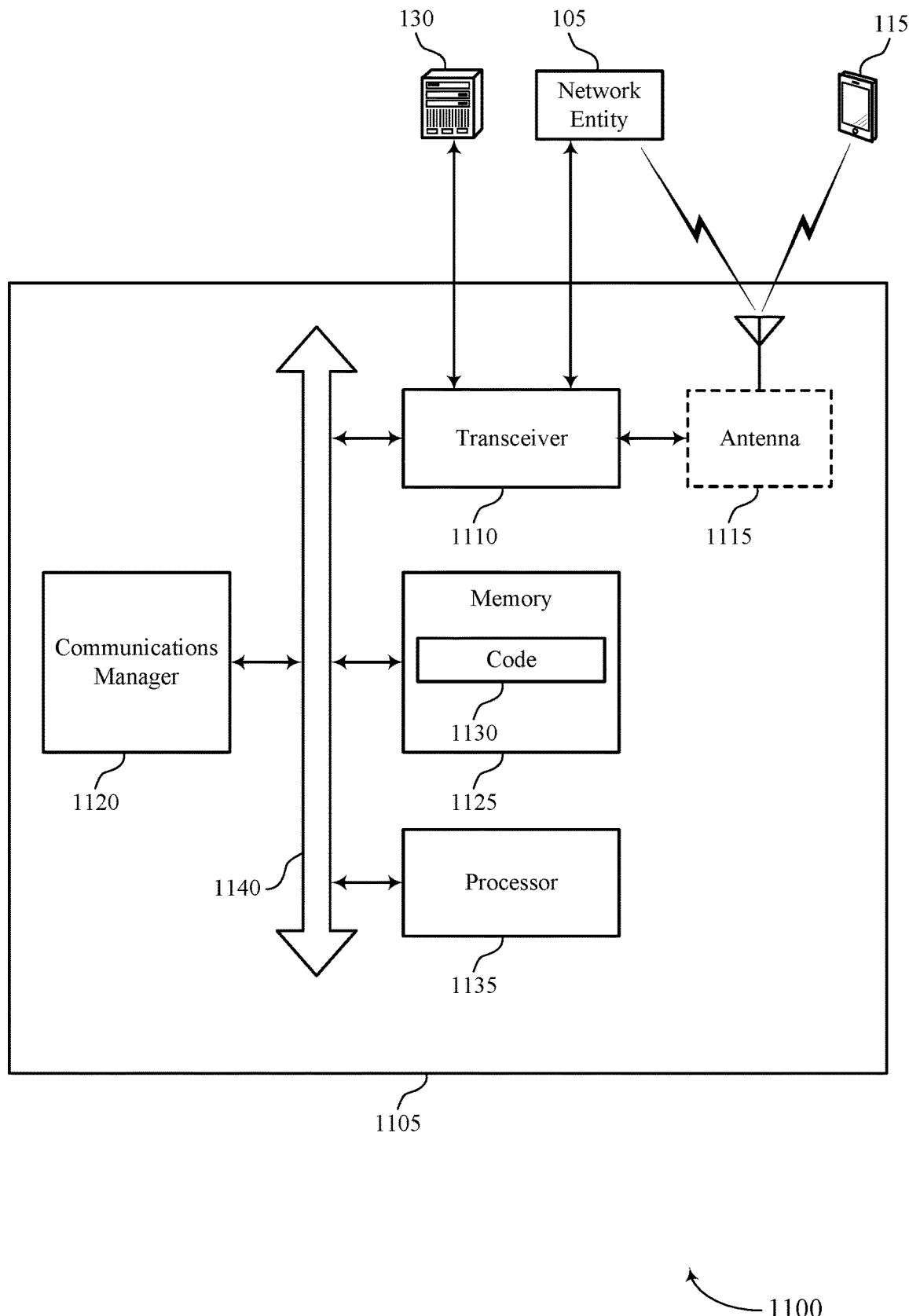
FIG. 11 shows a diagram of a system including a device that supports negotiation and notification of PDU set or data burst marking mechanisms in accordance with one or more aspects of the present disclosure.

FIG. 11 shows a diagram of a system 1100 including a device 1105 that supports negotiation and notification of PDU set or data burst marking mechanisms in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting negotiation and notification of PDU set or data burst marking mechanisms). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for outputting, to a core network entity, a request for transmission of information indicative of a set of available marking mechanisms for identification of packets that belong to a same PDU set or a same data burst. The communications manager 1120 may be configured as or otherwise support a means for obtaining, from the core network entity and responsive to the request, the information indicative of the set of available marking mechanisms. The communications manager 1120 may be configured as or otherwise support a means for outputting, to the core network entity, an indication of a subset of one or more marking mechanisms from the set of available marking mechanisms, where at least one marking mechanism of the subset of one or more marking mechanisms corresponds to a policy control rule update for the core network entity.

Additionally, or alternatively, the communications manager 1120 may support wireless communication at a first network entity in accordance with examples as disclosed herein. For example, the communications manager 1120 may be configured as or otherwise support a means for obtaining, from a second network entity, a request for transmission of information indicative of a set of available marking mechanisms for identification of packets that belong to a same PDU set or a same data burst. The communications manager 1120 may be configured as or otherwise support a means for obtaining, in accordance with a network configuration, the information indicative of the set of available marking mechanisms. The communications manager 1120 may be configured as or otherwise support a means for outputting, to the second network entity and responsive to the request, the information indicative of the set of available marking mechanisms.

Additionally, or alternatively, the communications manager 1120 may support wireless communication at a first network entity in accordance with examples as disclosed herein. For example, the communications manager 1120 may be configured as or otherwise support a means for obtaining, from second network entity, information indicative of a subset of one or more marking mechanisms from a set of available marking mechanisms, where the set of available marking mechanisms enables identification of packets that belong to a same PDU set or a same data burst. The communications manager 1120 may be configured as or otherwise support a means for updating a policy control rule associated with one or both of PDU set marking or data burst marking in accordance with at least one marking mechanism of the subset of one or more marking mechanisms.

Additionally, or alternatively, the communications manager 1120 may support wireless communication at a first network entity in accordance with examples as disclosed herein. For example, the communications manager 1120 may be configured as or otherwise support a means for outputting, to a core network entity, a request for transmission of information indicative of a marking mechanism, where the marking mechanism enables identification of packets that belong to a same PDU set or a same data burst. The communications manager 1120 may be configured as or otherwise support a means for obtaining, from the core network entity and in accordance with the request, the information indicative of the marking mechanism. The communications manager 1120 may be configured as or otherwise support a means for outputting, to a second network entity, an indication of the marking mechanism, where the indication of the marking mechanism to the second network entity is associated with an establishment of a traffic flow in accordance with the marking mechanism.

Additionally, or alternatively, the communications manager 1120 may support wireless communication at a first network entity in accordance with examples as disclosed herein. For example, the communications manager 1120 may be configured as or otherwise support a means for obtaining, from a second network entity, a request for transmission of information indicative of a marking mechanism, where the marking mechanism enables identification of packets that belong to a same PDU set or a same data burst. The communications manager 1120 may be configured as or otherwise support a means for obtaining, in accordance with one or more policy control rules, the information indicative of the marking mechanism. The communications manager 1120 may be configured as or otherwise support a means for outputting, to the second network entity and in accordance with the request, the information indicative of the marking mechanism, where the information indicative of the marking mechanism is associated with an establishment of a traffic flow in accordance with the marking mechanism.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of negotiation and notification of PDU set or data burst marking mechanisms as described herein, or the processor 1135 and the memory 1125 may be otherwise configured to perform or support such operations.

Figure 12:
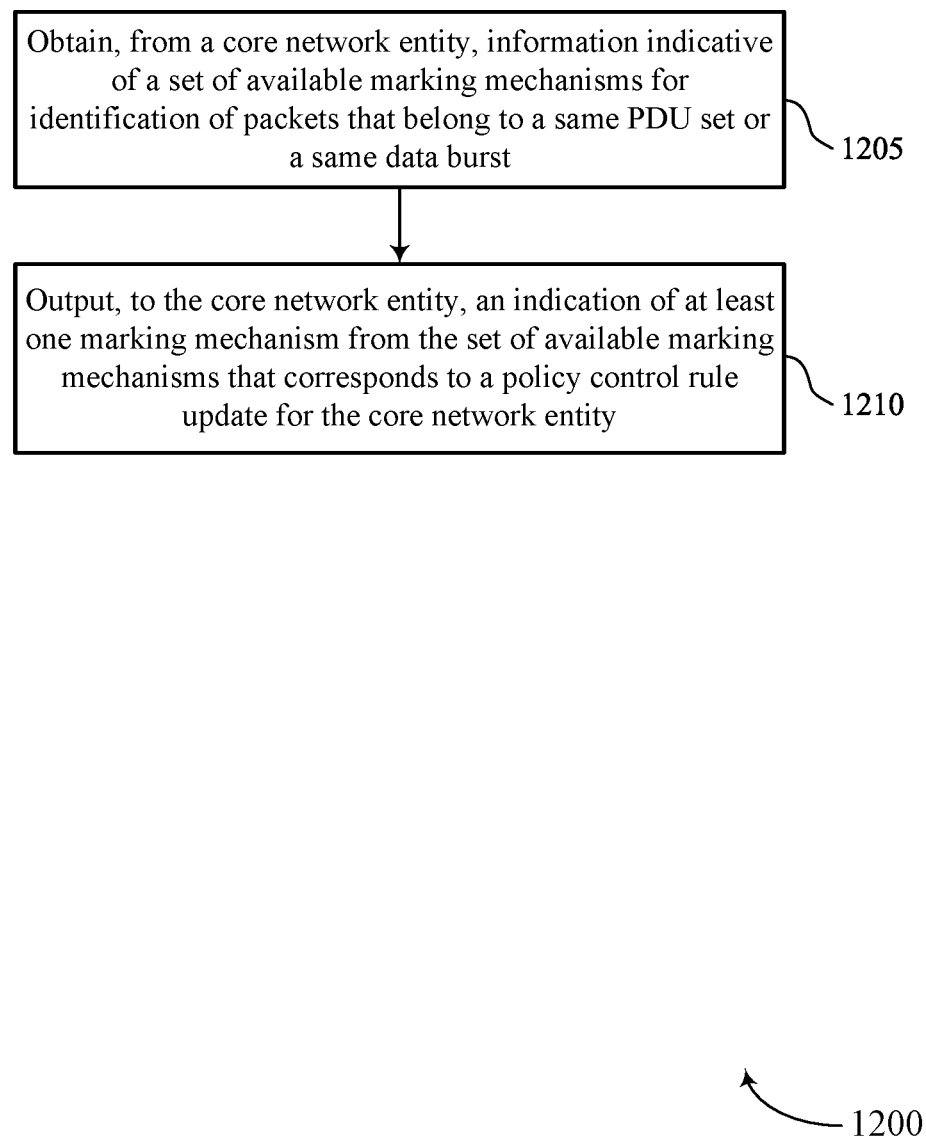
FIGS. 12 through 16 show flowcharts illustrating methods that support negotiation and notification of PDU set or data burst marking mechanisms in accordance with one or more aspects of the present disclosure.

FIG. 12 shows a flowchart illustrating a method 1200 that supports negotiation and notification of PDU set or data burst marking mechanisms in accordance with one or more aspects of the present disclosure. The operations of the method 1200 may be implemented by a network entity or its components as described herein. For example, the operations of the method 1200 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1205, the method may include obtaining, from a core network entity, information indicative of a set of available marking mechanisms for identification of packets that belong to a same PDU set or a same data burst. The operations of 1205 may be performed in accordance with examples as disclosed herein. In some examples, aspects of the operations of 1205 may be performed by a notification component 1030 as described with reference to FIG. 10.

At 1210, the method may include outputting, to the core network entity, an indication of at least one marking mechanism from the set of available marking mechanisms that corresponds to a policy control rule update for the core network entity. The operations of 1210 may be performed in accordance with examples as disclosed herein. In some examples, aspects of the operations of 1210 may be performed by a policy control rule update component 1035 as described with reference to FIG. 10.

Figure 13:
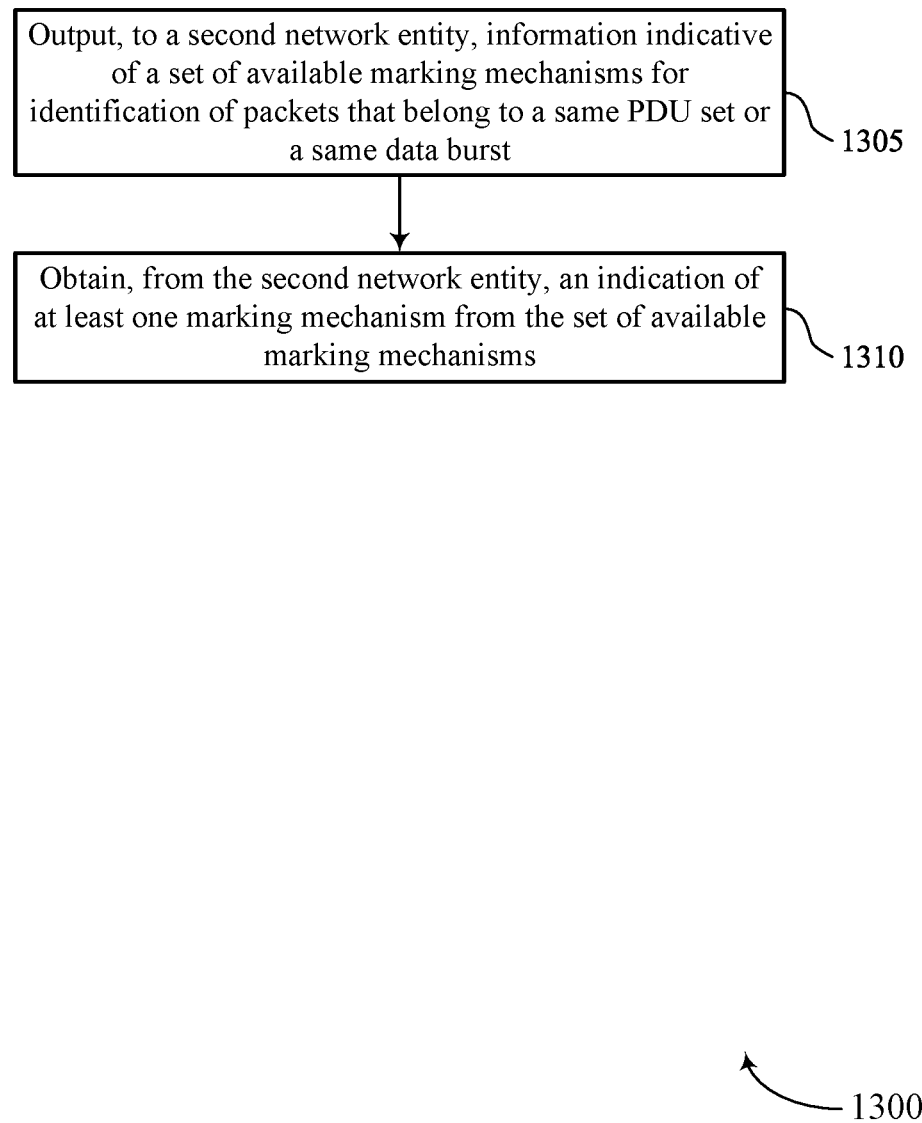

FIG. 13 shows a flowchart illustrating a method 1300 that supports negotiation and notification of PDU set or data burst marking mechanisms in accordance with one or more aspects of the present disclosure. The operations of the method 1300 may be implemented by a network entity or its components as described herein. For example, the operations of the method 1300 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1305, the method may include outputting, to a second network entity, information indicative of a set of available marking mechanisms for identification of packets that belong to a same PDU set or a same data burst. The operations of 1305 may be performed in accordance with examples as disclosed herein. In some examples, aspects of the operations of 1305 may be performed by a notification component 1030 as described with reference to FIG. 10.

At 1310, the method may include obtaining, from the second network entity, an indication of at least one marking mechanism from the set of available marking mechanisms. The operations of 1310 may be performed in accordance with examples as disclosed herein. In some examples, aspects of the operations of 1310 may be performed by a policy control rule update component 1035 as described with reference to FIG. 10

Figure 14:
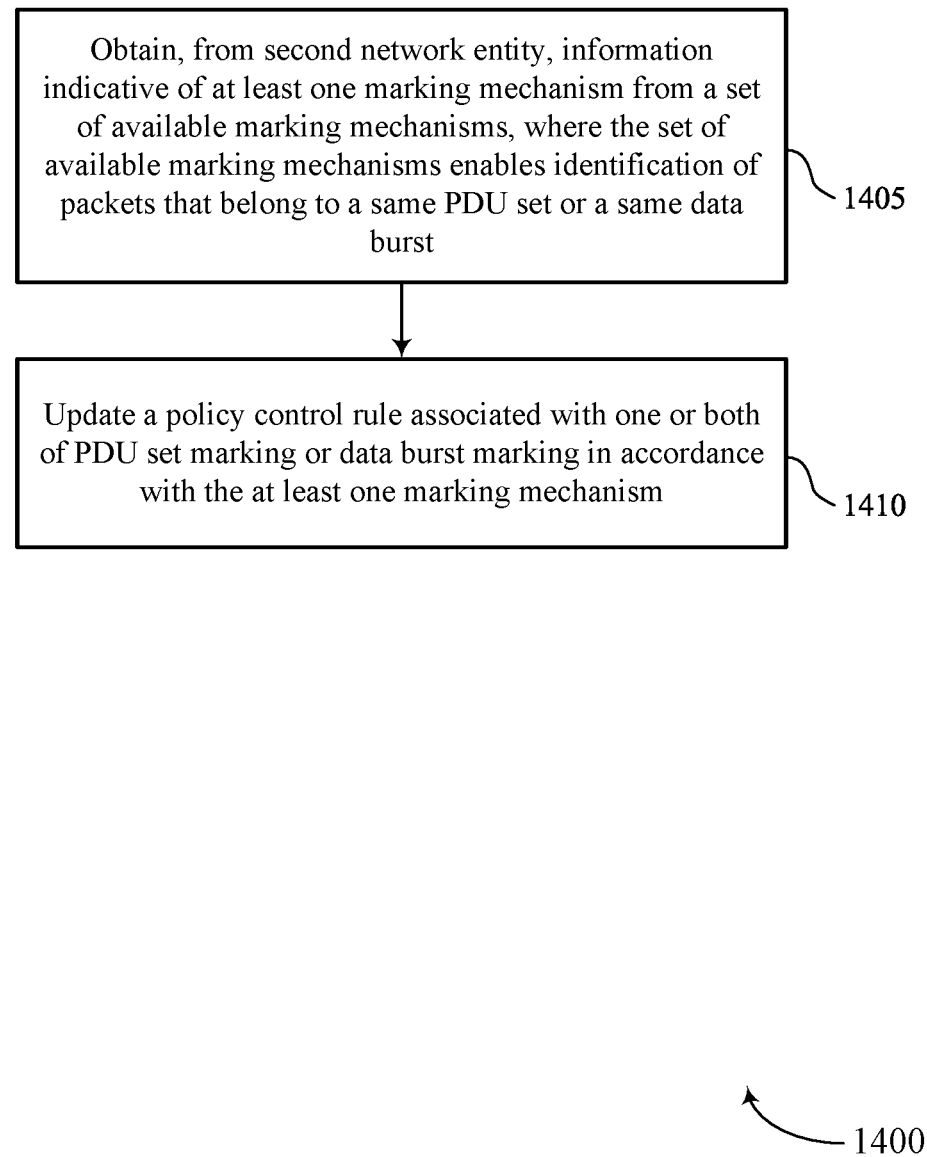

FIG. 14 shows a flowchart illustrating a method 1400 that supports negotiation and notification of PDU set or data burst marking mechanisms in accordance with one or more aspects of the present disclosure. The operations of the method 1400 may be implemented by a network entity or its components as described herein. For example, the operations of the method 1400 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1405, the method may include obtaining, from second network entity, information indicative of at least one marking mechanism from a set of available marking mechanisms, where the set of available marking mechanisms enables identification of packets that belong to a same PDU set or a same data burst. The operations of 1405 may be performed in accordance with examples as disclosed herein. In some examples, aspects of the operations of 1405 may be performed by a marking mechanism component 1045 as described with reference to FIG. 10.

At 1410, the method may include updating a policy control rule associated with one or both of PDU set marking or data burst marking in accordance with the at least one marking mechanism. The operations of 1410 may be performed in accordance with examples as disclosed herein. In some examples, aspects of the operations of 1410 may be performed by a policy control rule update component 1035 as described with reference to FIG. 10.

Figure 15:
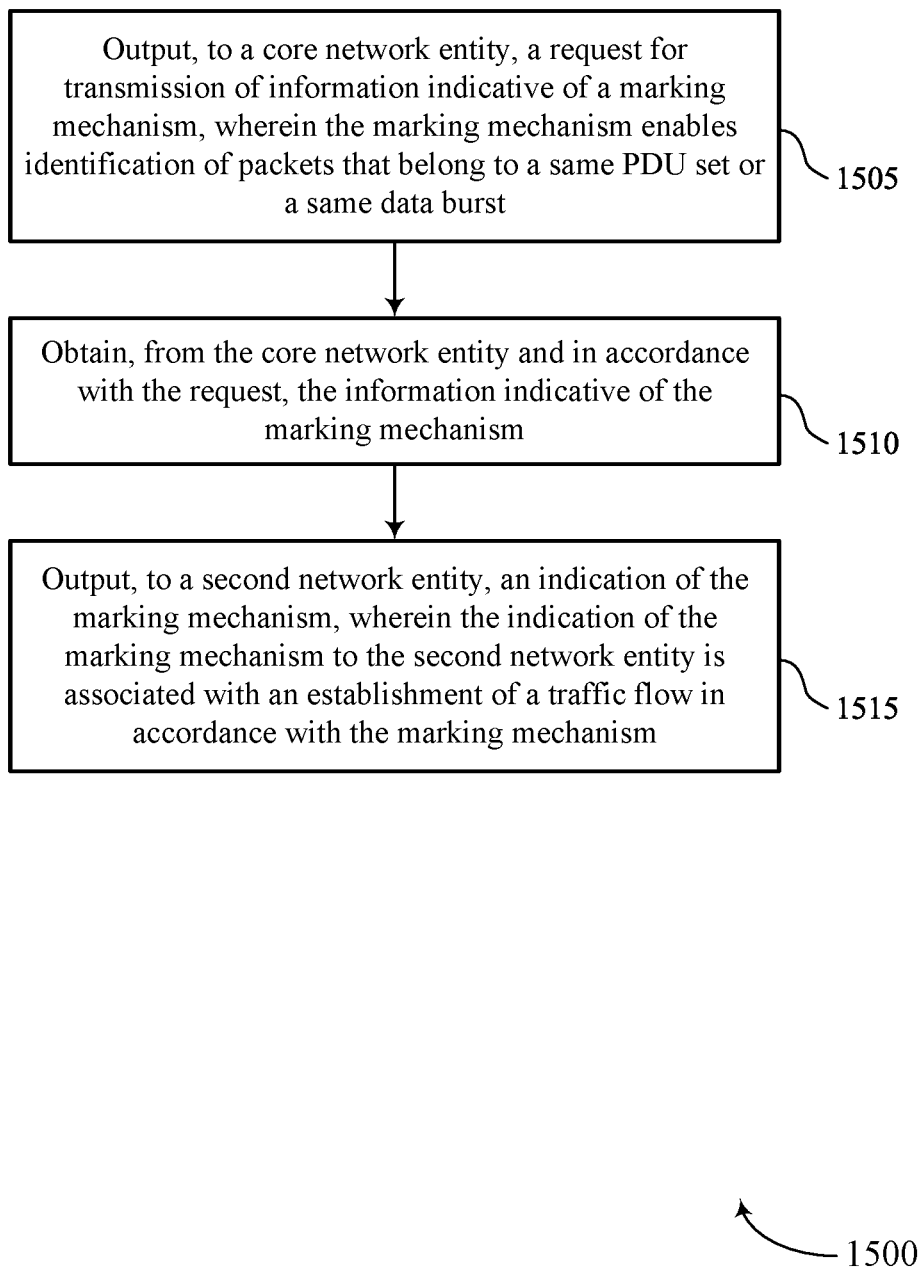

FIG. 15 shows a flowchart illustrating a method 1500 that supports negotiation and notification of PDU set or data burst marking mechanisms in accordance with one or more aspects of the present disclosure. The operations of the method 1500 may be implemented by a network entity or its components as described herein. For example, the operations of the method 1500 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1505, the method may include outputting, to a core network entity, a request for transmission of information indicative of a marking mechanism, where the marking mechanism enables identification of packets that belong to a same PDU set or a same data burst. The operations of 1505 may be performed in accordance with examples as disclosed herein. In some examples, aspects of the operations of 1505 may be performed by a subscription request component 1025 as described with reference to FIG. 10.

At 1510, the method may include obtaining, from the core network entity and in accordance with the request, the information indicative of the marking mechanism. The operations of 1510 may be performed in accordance with examples as disclosed herein. In some examples, aspects of the operations of 1510 may be performed by a notification component 1030 as described with reference to FIG. 10.

At 1515, the method may include outputting, to a second network entity, an indication of the marking mechanism, where the indication of the marking mechanism to the second network entity is associated with an establishment of a traffic flow in accordance with the marking mechanism. The operations of 1515 may be performed in accordance with examples as disclosed herein. In some examples, aspects of the operations of 1515 may be performed by a traffic flow marking component 1050 as described with reference to FIG. 10.

Figure 16:
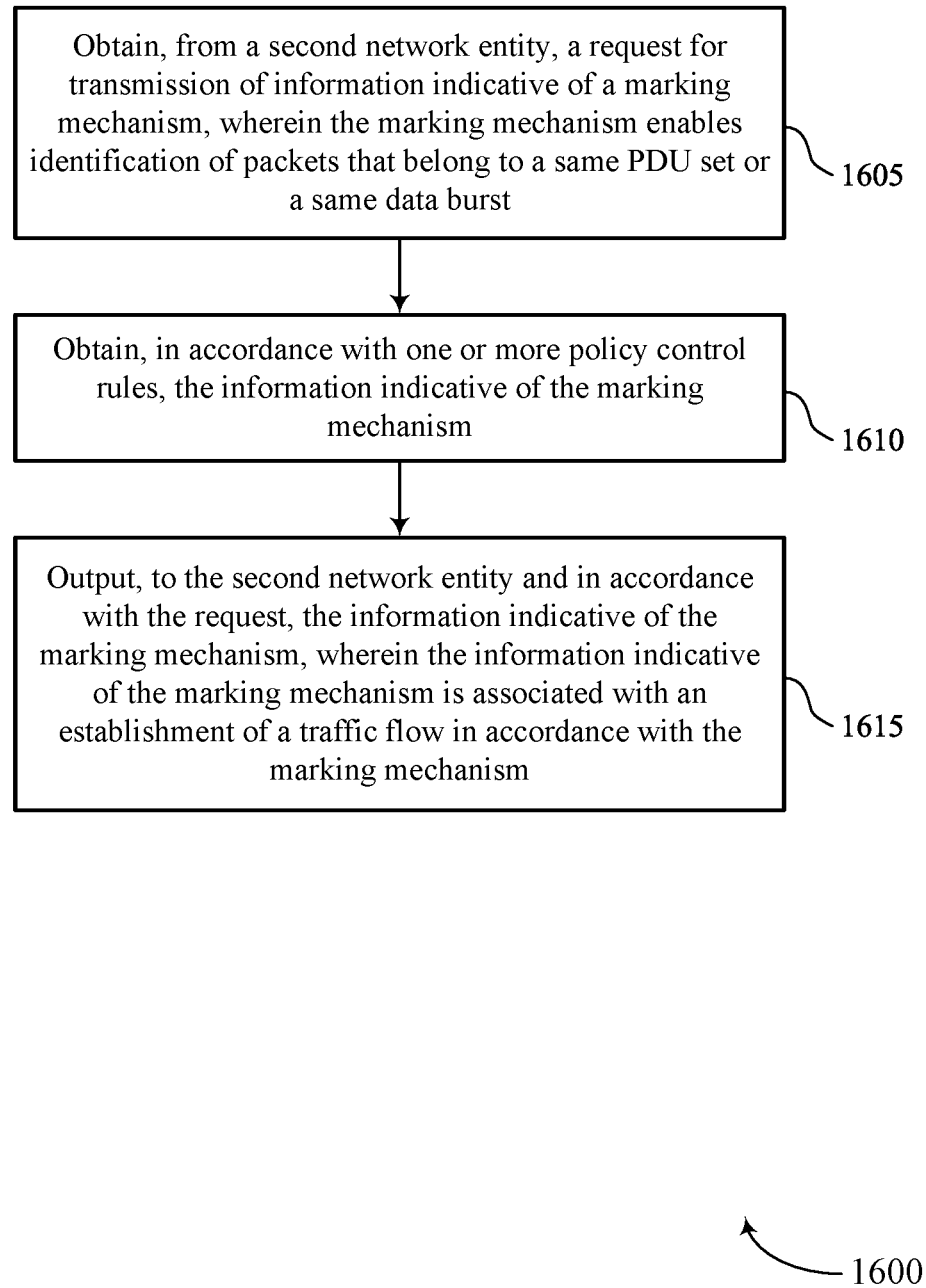

FIG. 16 shows a flowchart illustrating a method 1600 that supports negotiation and notification of PDU set or data burst marking mechanisms in accordance with one or more aspects of the present disclosure. The operations of the method 1600 may be implemented by a network entity or its components as described herein. For example, the operations of the method 1600 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1605, the method may include obtaining, from a second network entity, a request for transmission of information indicative of a marking mechanism, where the marking mechanism enables identification of packets that belong to a same PDU set or a same data burst. The operations of 1605 may be performed in accordance with examples as disclosed herein. In some examples, aspects of the operations of 1605 may be performed by a subscription request component 1025 as described with reference to FIG. 10.

At 1610, the method may include obtaining, in accordance with one or more policy control rules, the information indicative of the marking mechanism. The operations of 1610 may be performed in accordance with examples as disclosed herein. In some examples, aspects of the operations of 1610 may be performed by a policy control rule component 1055 as described with reference to FIG. 10.

At 1615, the method may include outputting, to the second network entity and in accordance with the request, the information indicative of the marking mechanism, where the information indicative of the marking mechanism is associated with an establishment of a traffic flow in accordance with the marking mechanism. The operations of 1615 may be performed in accordance with examples as disclosed herein. In some examples, aspects of the operations of 1615 may be performed by a notification component 1030 as described with reference to FIG. 10.

The following provides an overview of aspects of the present disclosure:

Aspect 1: A method of wireless communication performed by a network entity, comprising: outputting, to a core network entity, a request for transmission of information indicative of a set of available marking mechanisms for identification of packets that belong to a same PDU set or a same data burst; obtaining, from the core network entity and responsive to the request, the information indicative of the set of available marking mechanisms; and outputting, to the core network entity, an indication of a subset of one or more marking mechanisms from the set of available marking mechanisms, wherein at least one marking mechanism of the subset of one or more marking mechanisms corresponds to a policy control rule update for the core network entity.

Aspect 2: The method of aspect 1, wherein outputting the request comprises: outputting the request to an NEF via a subscription request message, wherein the core network entity includes the NEF.

Aspect 3: The method of aspect 2, wherein the subscription request message includes an event that indicates that the request corresponds to one or both of PDU set marking or data burst marking.

Aspect 4: The method of any of aspects 2 through 3, wherein the subscription request message is an event exposure subscription request message.

Aspect 5: The method of any of aspects 1 through 4, wherein obtaining the information comprises: obtaining the information from an NEF via an event exposure notification message, wherein the core network entity includes the NEF.

Aspect 6: The method of any of aspects 1 through 4, wherein the core network entity includes an NEF, and wherein the information indicative of the set of available marking mechanisms is associated with the NEF.

Aspect 7: The method of any of aspects 1 through 6, wherein obtaining the information comprises: obtaining capability information associated with the core network entity, wherein the capability information is indicative of the set of available marking mechanisms, and wherein an obtainment of the information is associated with an exposure of the set of available marking mechanisms to the network entity.

Aspect 8: The method of any of aspects 1 through 7, wherein outputting the indication comprises: outputting the indication to a PCF, wherein the core network entity includes the PCF.

Aspect 9: The method of any of aspects 1 through 7, wherein the core network entity includes a PCF, and wherein the policy control rule update for the core network entity is associated with the PCF.

Aspect 10: The method of any of aspects 8 or 9, wherein each respective marking mechanism of the subset of one or more marking mechanisms is compatible with the network entity.

Aspect 11: The method of any of aspects 8 through 10, wherein outputting the indication comprises: outputting the indication to the PCF via an NEF.

Aspect 12: The method of any of aspects 1 through 11, wherein the set of available marking mechanisms is associated with a network configuration.

Aspect 13: The method of aspect 12, wherein the set of available marking mechanisms is stored in one or more of a memory accessible by an NEF; a unified data repository; or an operations, administration, and maintenance entity in accordance with the network configuration.

Aspect 14: The method of any of aspects 12 through 13, wherein obtaining the information comprises: obtaining the information from one or more of a memory accessible by an NEF; a unified data repository; or an operations, administration, and maintenance entity in accordance with the network configuration.

Aspect 15: The method of any of aspects 1 through 14, wherein the network entity is an AF and the core network entity includes one or both of an NEF or a PCF.

Aspect 16: A method of wireless communication performed by a first network entity, comprising: obtaining, from a second network entity, a request for transmission of information indicative of a set of available marking mechanisms for identification of packets that belong to a same PDU set or a same data burst; obtaining, in accordance with a network configuration, the information indicative of the set of available marking mechanisms; and outputting, to the second network entity and responsive to the request, the information indicative of the set of available marking mechanisms.

Aspect 17: The method of aspect 16, wherein obtaining the request comprises: obtaining the request from an AF via a subscription request message, wherein the second network entity is the AF.

Aspect 18: The method of aspect 17, wherein the subscription request message includes an event that indicates that the request corresponds to one or both of PDU set marking or data burst marking.

Aspect 19: The method of any of aspects 17 through 18, wherein the subscription request message is an event exposure subscription request message.

Aspect 20: The method of any of aspects 16 through 19, wherein outputting the information comprises: outputting the information to an AF via an event exposure notification message, wherein the second network entity is the AF.

Aspect 21: The method of any of aspects 16 through 20, further comprising: obtaining, from the second network entity, information indicative of a subset of one or more marking mechanisms from the set of available marking mechanisms; and outputting, to a PCF, an indication of the subset of one or more marking mechanisms, wherein at least one marking mechanism of the subset of one or more marking mechanisms corresponds to a policy control rule update for the PCF.

Aspect 22: The method of aspect 21, wherein each respective marking mechanism of the subset of one or more marking mechanisms is compatible with the second network entity.

Aspect 23: The method of any of aspects 16 through 22, wherein the set of available marking mechanisms is stored in one or more of a memory accessible by an NEF; a unified data repository; or an operations, administration, and maintenance entity in accordance with the network configuration.

Aspect 24: The method of any of aspects 16 through 23, wherein obtaining the information comprises: obtaining the information from one or more of a memory accessible by an NEF; a unified data repository; or an operations, administration, and maintenance entity in accordance with the network configuration.

Aspect 25: The method of any of aspects 16 through 24, wherein the first network entity is an NEF and the second network entity is an AF.

Aspect 26: A method of wireless communication performed by a first network entity, comprising: obtaining, from second network entity, information indicative of a subset of one or more marking mechanisms from a set of available marking mechanisms, wherein the set of available marking mechanisms enables identification of packets that belong to a same PDU set or a same data burst; and updating a policy control rule associated with one or both of PDU set marking or data burst marking in accordance with at least one marking mechanism of the subset of one or more marking mechanisms.

Aspect 27: The method of aspect 26, wherein updating the policy control rule comprises: permitting the first network entity to modify marking options for one or both of the PDU set marking or the data burst marking for a dynamic policy control rule used by an SMF.

Aspect 28: The method of any of aspects 26 through 27, wherein obtaining the information comprises: obtaining the information from an AF via an NEF, wherein the second network entity is the AF.

Aspect 29: The method of aspect 28, wherein each respective marking mechanism of the subset of one or more marking mechanisms is compatible with the AF.

Aspect 30: The method of any of aspects 26 through 29, wherein the set of available marking mechanisms is associated with a network configuration.

Aspect 31: The method of aspect 30, wherein the set of available marking mechanisms is stored in one or more of a memory accessible by an NEF; a unified data repository; or an operations, administration, and maintenance entity in accordance with the network configuration.

Aspect 32: The method of any of aspects 30 through 31, further comprising: obtaining the information from one or more of a memory accessible by an NEF; a unified data repository; or an operations, administration, and maintenance entity in accordance with the network configuration.

Aspect 33: The method of any of aspects 26 through 32, wherein the first network entity is a PCF and the second network entity is an AF.

Aspect 34: A method of wireless communication performed by a first network entity, comprising: outputting, to a core network entity, a request for transmission of information indicative of a marking mechanism, wherein the marking mechanism enables identification of packets that belong to a same PDU set or a same data burst; obtaining, from the core network entity and in accordance with the request, the information indicative of the marking mechanism; and outputting, to a second network entity, an indication of the marking mechanism, wherein the indication of the marking mechanism to the second network entity is associated with an establishment of a traffic flow in accordance with the marking mechanism.

Aspect 35: The method of aspect 34, wherein outputting the request comprises: outputting the request to an SMF via a subscription request message, wherein the core network entity includes the SMF.

Aspect 36: The method of aspect 35, wherein the subscription request message includes an event that indicates that the request corresponds to one or both of PDU set marking or data burst marking.

Aspect 37: The method of any of aspects 35 through 36, wherein outputting the request comprises: outputting the request to the SMF via an NEF and a unified data management function, wherein the core network entity further includes the NEF and the unified data management function.

Aspect 38: The method of any of aspects 35 through 37, wherein the subscription request message is an event exposure subscription request message.

Aspect 39: The method of any of aspects 34 through 38, wherein the marking mechanism is associated with a dynamic retrieval of one or more policy control rules from a PCF during a PDU session establishment or modification, the one or more policy control rules are based on one or more marking mechanisms that are compatible with the first network entity.

Aspect 40: The method of any of aspects 34 through 39, wherein the marking mechanism is associated with one or more policy control rules that are predefined for the core network entity, the one or more policy control rules are based on of one or more marking mechanisms that are compatible with the first network entity.

Aspect 41: The method of any of aspects 34 through 40, wherein obtaining the information comprises: obtaining the information from an SMF via an event exposure notification message, wherein the core network entity includes the SMF.

Aspect 42: The method of any of aspects 34 through 41, wherein the marking mechanism enables identification of PDU sets or data bursts sent by an AS to a user plane function.

Aspect 43: The method of any of aspects 34 through 42, wherein the first network entity is an AF, the core network entity is an SMF, and the second network entity is an AS.

Aspect 44: A method of wireless communication performed by a first network entity, comprising: obtaining, from a second network entity, a request for transmission of information indicative of a marking mechanism, wherein the marking mechanism enables identification of packets that belong to a same PDU set or a same data burst; obtaining, in accordance with one or more policy control rules, the information indicative of the marking mechanism; and outputting, to the second network entity and in accordance with the request, the information indicative of the marking mechanism, wherein the information indicative of the marking mechanism is associated with an establishment of a traffic flow in accordance with the marking mechanism.

Aspect 45: The method of aspect 44, wherein obtaining the request comprises: obtaining the request from an AF via a subscription request message, wherein the second network entity is the AF.

Aspect 46: The method of aspect 45, wherein the subscription request message includes an event that indicates that the request corresponds to one or both of PDU set marking or data burst marking.

Aspect 47: The method of aspect 46, further comprising: monitoring for the subscription request message based on the event.

Aspect 48: The method of any of aspects 45 through 47, wherein obtaining the request comprises: obtaining the request from the AF via an NEF and a unified data management function.

Aspect 49: The method of any of aspects 45 through 48, wherein the subscription request message is an event exposure subscription request message.

Aspect 50: The method of any of aspects 44 through 49, further comprising: obtaining, dynamically, the one or more policy control rules from a PCF during a PDU session establishment or modification, wherein the one or more policy control rules are based on one or more marking mechanisms that are compatible with the first network entity.

Aspect 51: The method of any of aspects 44 through 50, wherein the one or more policy control rules are predefined at the first network entity, the one or more policy control rules are based on one or more marking mechanisms that are compatible with the first network entity.

Aspect 52: The method of any of aspects 44 through 51, further comprising: select a user plane function based on the marking mechanism; and configuring the user plane function based on the marking mechanism, wherein a configuration of the user plane function based on the marking mechanism is associated with the establishment of the traffic flow in accordance with the marking mechanism.

Aspect 53: The method of aspect 52, further comprising: obtaining, from the user plane function, information indicative of a capability of the user plane function that is associated with the marking mechanism, wherein the user plane function is selected based on the capability of the user plane function.

Aspect 54: The method of any of aspects 52 through 53, further comprising: searching a set of marking mechanism options based on one or more marking mechanisms that are compatible with the second network entity; and identifying the user plane function based on the searching of the set of marking mechanism options, wherein the user plane function is identified based on being capable of at least one of the one or more marking mechanisms that are compatible with the second network entity.

Aspect 55: The method of any of aspects 44 through 54, wherein outputting the information comprises: outputting the information to an AF via an event exposure notification message, wherein the second network entity is the AF.

Aspect 56: The method of any of aspects 44 through 55, wherein the marking mechanism enables identification of PDU sets or data bursts sent by an AS to a user plane function.

Aspect 57: The method of any of aspects 44 through 56, wherein the first network entity is an SMF and the second network entity is an AF.

Aspect 58: An apparatus for wireless communication at a network entity, comprising a processor; memory coupled with the processor; and instructions stored in the memory and executable by the processor to cause the apparatus to perform a method of any of aspects 1 through 15.

Aspect 59: An apparatus for wireless communication at a network entity, comprising at least one means for performing a method of any of aspects 1 through 15.

Aspect 60: A non-transitory computer-readable medium storing code for wireless communication at a network entity, the code comprising instructions executable by a processor to perform a method of any of aspects 1 through 15.

Aspect 61: An apparatus for wireless communication at a first network entity, comprising a processor; memory coupled with the processor; and instructions stored in the memory and executable by the processor to cause the apparatus to perform a method of any of aspects 16 through 25.

Aspect 62: An apparatus for wireless communication at a first network entity, comprising at least one means for performing a method of any of aspects 16 through 25.

Aspect 63: A non-transitory computer-readable medium storing code for wireless communication at a first network entity, the code comprising instructions executable by a processor to perform a method of any of aspects 16 through 25.

Aspect 64: An apparatus for wireless communication at a first network entity, comprising a processor; memory coupled with the processor; and instructions stored in the memory and executable by the processor to cause the apparatus to perform a method of any of aspects 26 through 33.

Aspect 65: An apparatus for wireless communication at a first network entity, comprising at least one means for performing a method of any of aspects 26 through 33.

Aspect 66: A non-transitory computer-readable medium storing code for wireless communication at a first network entity, the code comprising instructions executable by a processor to perform a method of any of aspects 26 through 33.

Aspect 67: An apparatus for wireless communication at a first network entity, comprising a processor; memory coupled with the processor; and instructions stored in the memory and executable by the processor to cause the apparatus to perform a method of any of aspects 34 through 43.

Aspect 68: An apparatus for wireless communication at a first network entity, comprising at least one means for performing a method of any of aspects 34 through 43.

Aspect 69: A non-transitory computer-readable medium storing code for wireless communication at a first network entity, the code comprising instructions executable by a processor to perform a method of any of aspects 34 through 43.

Aspect 70: An apparatus for wireless communication at a first network entity, comprising a processor; memory coupled with the processor; and instructions stored in the memory and executable by the processor to cause the apparatus to perform a method of any of aspects 44 through 57.

Aspect 71: An apparatus for wireless communication at a first network entity, comprising at least one means for performing a method of any of aspects 44 through 57.

Aspect 72: A non-transitory computer-readable medium storing code for wireless communication at a first network entity, the code comprising instructions executable by a processor to perform a method of any of aspects 44 through 57.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the figures, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity for wireless communication, comprising:
   a memory; and
   at least one processor coupled to the memory, wherein the at least one processor is configured to:
      output, from an application function of the network entity to a core network entity, an indication of at least one marking mechanism from a plurality of available marking mechanisms, wherein the at least one marking mechanism corresponds to a policy control rule for the core network entity to apply to a protocol data unit (PDU) set or a data burst, and wherein:
         at least one of the application function or communication between the core network entity and the application function is authorized, and
         each marking mechanism of the plurality of available marking mechanisms is associated with a respective protocol configured to cause an application server or a user plane function to mark each packet within a set of packets to identify that each packet of the set of packets belongs to a specific PDU set or a specific data burst, and wherein each respective protocol is different relative to each other.

2. The network entity of claim 1, wherein the core network entity includes a policy control function, and wherein the policy control rule for the core network entity is associated with the policy control function.

3. The network entity of claim 2, wherein each respective marking mechanism of the at least one marking mechanism is compatible with the application function of the network entity.

4. The network entity of claim 2, wherein, to output the indication, the at least one processor is configured to:
output the indication to the policy control function via a network exposure function.

5. The network entity of claim 1, wherein the plurality of available marking mechanisms is associated with a network configuration.

6. The network entity of claim 5, wherein the plurality of available marking mechanisms is stored in one or more of a memory accessible by a network exposure function; a unified data repository; or an operations, administration, and maintenance entity in accordance with the network configuration.

7. The network entity of claim 1, wherein the core network entity includes a network exposure function, and wherein the plurality of available marking mechanisms is associated with the network exposure function.

8. The network entity of claim 1, wherein the network entity is the application function and the core network entity includes one or both of a network exposure function or a policy control function.

9. The network entity of claim 1, wherein the plurality of available marking mechanisms comprises a real-time transport protocol header based marking mechanism and a secure real-time transport protocol header based marking mechanism.

10. A method of wireless communication performed by a network entity, comprising:
outputting, from an application function of the network entity to a core network entity, an indication of at least one marking mechanism from a plurality of available marking mechanisms, wherein the at least one marking mechanism corresponds to a policy control rule for the core network entity to apply to a protocol data unit (PDU) set or a data burst, and wherein:
at least one of the application function or communication between the core network entity and the application function is authorized, and
each marking mechanism of the plurality of available marking mechanisms is associated with a respective protocol configured to cause an application server or a user plane function to mark each packet within a set of packets to identify that each packet of the set of packets belongs to a specific PDU set or a specific data burst, and wherein each respective protocol is different relative to each other.

11. The method of claim 10, wherein the core network entity includes a network exposure function, and wherein the plurality of available marking mechanisms is associated with the network exposure function.

12. The method of claim 10, wherein the core network entity includes a policy control function, and wherein the policy control rule for the core network entity is associated with the policy control function.

13. The method of claim 12, wherein outputting the indication comprises:
outputting the indication to the policy control function via a network exposure function.

14. The method of claim 12, wherein each respective marking mechanism of the at least one marking mechanism is compatible with the application function of the network entity.

15. The method of claim 10, wherein the plurality of available marking mechanisms is associated with a network configuration.

16. The method of claim 15, wherein the plurality of available marking mechanisms is stored in one or more of a memory accessible by a network exposure function; a unified data repository; or an operations, administration, and maintenance entity in accordance with the network configuration.

17. The method of claim 10, wherein the network entity is the application function and the core network entity includes one or both of a network exposure function or a policy control function.

18. A network entity for wireless communication, comprising:
means for outputting, from an application function of the network entity to a core network entity, an indication of at least one marking mechanism from a plurality of available marking mechanisms, wherein the at least one marking mechanism corresponds to a policy control rule for the core network entity to apply to a protocol data unit (PDU) set or a data burst, and wherein:
at least one of the application function or communication between the core network entity and the application function is authorized, and
each marking mechanism of the plurality of available marking mechanisms is associated with a respective protocol configured to cause an application server or a user plane function to mark each packet within a set of packets to identify that each packet of the set of packets belongs to a specific PDU set or a specific data burst, and wherein each respective protocol is different relative to each other.

19. The network entity of claim 18, wherein the core network entity includes a policy control function, and wherein the policy control rule for the core network entity is associated with the policy control function.

20. The network entity of claim 19, wherein each respective marking mechanism of the at least one marking mechanism is compatible with the application function of the network entity.

21. The network entity of claim 19, wherein the means for outputting the indication comprise:
means for outputting the indication to the policy control function via a network exposure function.

22. The network entity of claim 18, wherein the plurality of available marking mechanisms is associated with a network configuration.

23. The network entity of claim 18, wherein the core network entity includes a network exposure function, and wherein the plurality of available marking mechanisms is associated with the network exposure function.

24. A non-transitory computer-readable medium having code stored thereon that, when executed by at least one processor of a network entity, causes the network entity to:
output, from an application function of the network entity to a core network entity, an indication of at least one marking mechanism from a plurality of available marking mechanisms, wherein the at least one marking mechanism corresponds to a policy control rule for the core network entity to apply to a protocol data unit (PDU) set or a data burst, and wherein:

at least one of the application function or communication between the core network entity and the application function is authorized, and each marking mechanism of the plurality of available marking mechanisms is associated with a respective protocol configured to cause an application server or a user plane function to mark each packet within a set of packets to identify that each packet of the set of packets belongs to a specific PDU set or a specific data burst, and wherein each respective protocol is different relative to each other.

25. The non-transitory computer-readable medium of claim 24, wherein the core network entity includes a network exposure function, and wherein the plurality of available marking mechanisms is associated with the network exposure function.

26. The non-transitory computer-readable medium of claim 24, wherein the core network entity includes a policy control function, and wherein the policy control rule for the core network entity is associated with the policy control function.

\* \* \* \* \*